(12) United States Patent
Taniguchi et al.

(10) Patent No.: US 11,196,831 B2
(45) Date of Patent: Dec. 7, 2021

(54) COMMUNICATION APPARATUS, COMMUNICATION METHOD, AND STORAGE MEDIUM

(71) Applicant: CANON KABUSHIKI KAISHA, Tokyo (JP)

(72) Inventors: Kazuya Taniguchi, Kawasaki (JP); Kensuke Yasuma, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 16/158,879

(22) Filed: Oct. 12, 2018

(65) Prior Publication Data
US 2019/0132407 A1 May 2, 2019

(30) Foreign Application Priority Data

Oct. 31, 2017 (JP) .............................. JP2017-211154
Oct. 31, 2017 (JP) .............................. JP2017-211157

(51) Int. Cl.
*G06F 15/16* (2006.01)
*H04L 29/08* (2006.01)
(Continued)

(52) U.S. Cl.
CPC .......... *H04L 67/26* (2013.01); *H04L 61/3085* (2013.01); *H04L 65/1006* (2013.01);
(Continued)

(58) Field of Classification Search
CPC ............. H04L 12/2803; H04L 12/2807; H04L 12/2814; H04L 45/24; H04L 45/30
(Continued)

(56) References Cited

U.S. PATENT DOCUMENTS

| 2002/0052798 | A1* | 5/2002 | Nishikado | .......... G06Q 30/0641 |
| | | | | 709/203 |
| 2004/0058644 | A1* | 3/2004 | Saigo | ...................... H04L 67/24 |
| | | | | 455/11.1 |

(Continued)

FOREIGN PATENT DOCUMENTS

| JP | H1155258 A | 2/1999 |
| JP | 2012-083924 A | 4/2012 |
| JP | 2016152024 A | 8/2016 |

*Primary Examiner* — Farzana B Huq
(74) *Attorney, Agent, or Firm* — Canon U.S.A., Inc. IP Division

(57) ABSTRACT

A communication apparatus includes a transmission unit configured to, in response to an information request from another apparatus, transmit issued information issued by the communication apparatus to the another apparatus, a first reception unit configured to receive a transfer request based on the issued information from a client apparatus, a second reception unit configured to receive, from a server apparatus, data to be transferred to the client apparatus operating as a transmission source of the transfer request based on the issued information, and a transfer unit configured to, in a case where the first reception unit receives the transfer request based on the issued information from each of a plurality of client apparatuses including a client apparatus to which the issued information issued by the communication apparatus is not transmitted by the transmission unit, transfer the data received from the server apparatus to the plurality of client apparatuses.

16 Claims, 16 Drawing Sheets

(51) Int. Cl.
*H04L 29/12* (2006.01)
*H04L 29/06* (2006.01)

(52) U.S. Cl.
CPC ...... *H04L 65/4061* (2013.01); *H04L 65/4076* (2013.01); *H04L 67/28* (2013.01); *H04L 67/42* (2013.01)

(58) Field of Classification Search
USPC .............................. 709/206, 226, 219, 228
See application file for complete search history.

(56) References Cited

U.S. PATENT DOCUMENTS

| | | | |
|---|---|---|---|
| 2008/0046574 A1* | 2/2008 | Kinoshita | H04L 67/28 709/228 |
| 2012/0166593 A1* | 6/2012 | Yoon | H04L 67/18 709/219 |
| 2012/0195505 A1* | 8/2012 | Park | G06K 9/344 382/176 |
| 2013/0159377 A1 | 6/2013 | Nash | |
| 2014/0280464 A1 | 9/2014 | De Ding et al. | |
| 2016/0246994 A1 | 8/2016 | Ogura et al. | |
| 2016/0249395 A1* | 8/2016 | Logue | G08B 25/003 |
| 2016/0373342 A1* | 12/2016 | Kolan | H04L 45/24 |
| 2018/0219976 A1* | 8/2018 | Decenzo | H04L 65/4084 |
| 2019/0273797 A1* | 9/2019 | Chiba | H04L 67/2842 |

\* cited by examiner

FIG.11A

| PUSH URI | PUSH MESSAGE SUBSCRIPTION URI |
|---|---|
| /push/xxxxxxx | /subscription/aaaaaa |
| /push/yyyyyy | /subscription/bbbbbb |
| | |

FIG.11B

| PUSH URI | DEVICE INFORMATION |
|---|---|
| /push/xxxxxxx | CLIENT APPARATUS 102 |
| /push/xxxxxxx | CLIENT APPARATUS 103 |
| | |

FIG.11C

| DEVICE INFORMATION | PUSH URI | RECEIPT SUBSCRIPTION URI | PUSH MESSAGE URI | PUSH POLICY |
|---|---|---|---|---|
| SERVER APPARATUS 104 | /push/xxxxxxx | /receipt/cccccc | /d/eeeeee | ALL |
| SERVER APPARATUS 105 | /push/yyyyyy | /receipt/ddddd | /d/ffffff | ANY |
| | | | | |

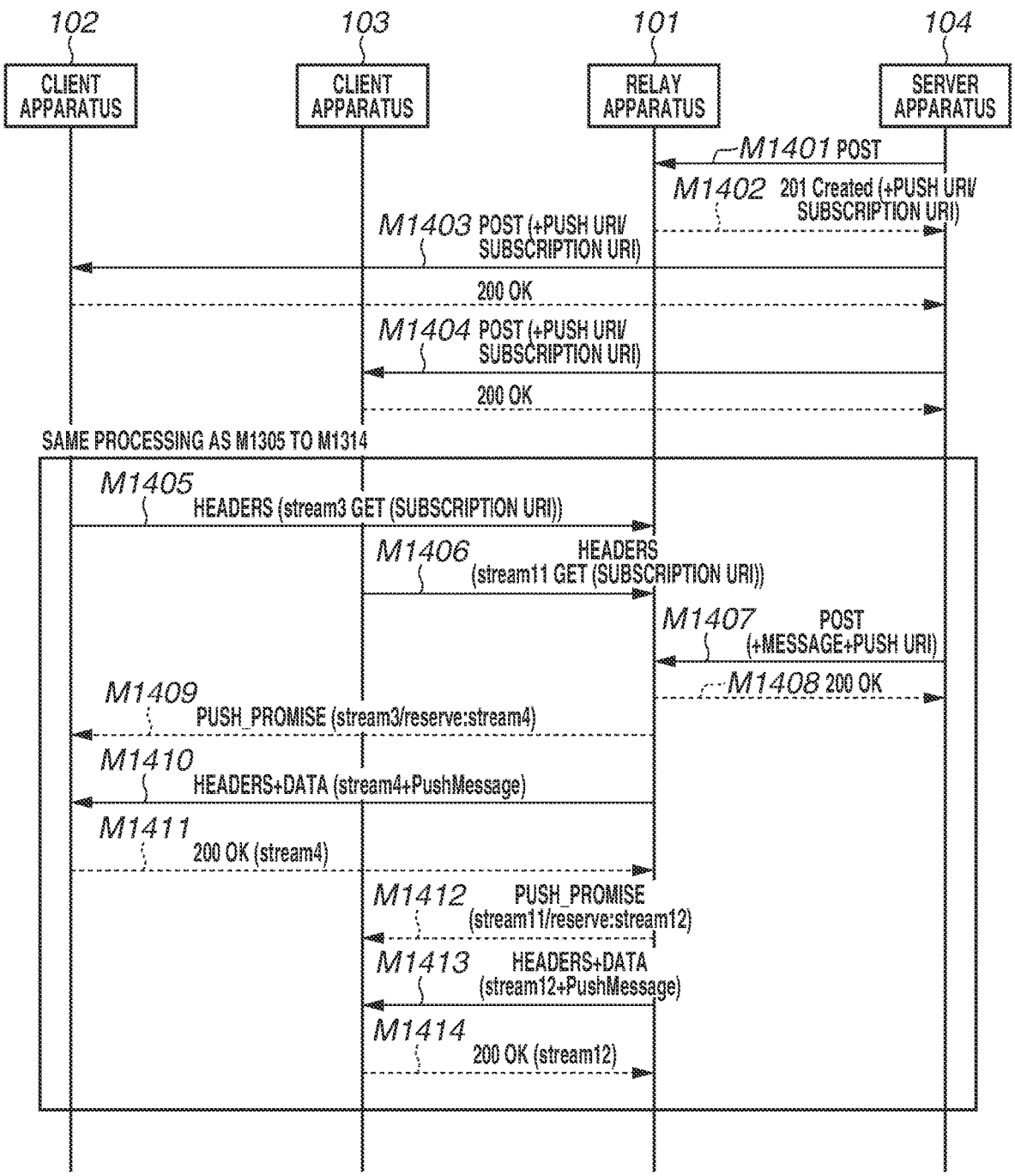

COMMUNICATION APPARATUS, COMMUNICATION METHOD, AND STORAGE MEDIUM

BACKGROUND

Field of the Disclosure

The present disclosure relates to a technique for transmitting data from a server apparatus to a client apparatus via a communication apparatus.

Description of the Related Art

In recent years, there has been devised a push service for carrying out push-type data transmission from a server apparatus to a client apparatus. In the push service, the server apparatus transmits, to the client apparatus, data for notifying the client apparatus of the occurrence of an event independently of a timing when a request is issued from the client apparatus to the server apparatus. The Internet Engineering Task Force (IETF) has proposed the Web Push protocol as a method for realizing the push service using the web technique. In communication in compliance with the Web Push protocol, a communication apparatus (a push service (PS)) transfers data transmitted from the server apparatus (an application server (AS)) to the client apparatus (a user agent (UA)). This transfer realizes the push-type data transmission from the AS to the UA. Japanese Patent Application Laid-Open No. 2012-83924 discusses that a server apparatus connected to a plurality of client apparatuses pushes, to one client apparatus, information indicating statuses of the other client apparatuses.

The conventional technique leads to an undesirable increase in a processing load on the server apparatus regarding the data transmission to the communication apparatus in a case where the data is transmitted from the server apparatus to the plurality of client apparatuses via the communication apparatus. For example, in the communication in compliance with the Web Push protocol, in a case where the same data is transmitted from the AS to a plurality of UAs via the PS, a processing load on the AS increases because the AS carries out data transmission addressed to each of the plurality of UAs to the PS a plurality of times.

SUMMARY

According to some embodiments, a communication apparatus is configured to transfer data received from a server apparatus to a client apparatus. The communication apparatus includes a transmission unit configured to, in response to an information request from another apparatus different from the communication apparatus, transmit issued information to the another apparatus, the issued information being issued by the communication apparatus, a first reception unit configured to receive a transfer request based on the issued information from the client apparatus, a second reception unit configured to receive, from the server apparatus, the data to be transferred to the client apparatus operating as a transmission source of the transfer request based on the issued information, and a transfer unit configured to, in a case where the first reception unit receives the transfer request based on the issued information from each of a plurality of client apparatuses including a client apparatus to which the issued information issued by the communication apparatus is not transmitted by the transmission unit, transfer the data received from the server apparatus by the second reception unit to the plurality of client apparatuses.

Further features of various embodiments will become apparent from the following description of exemplary embodiments with reference to the attached drawings.

BRIEF DESCRIPTION OF THE DRAWINGS

FIGS. 11A, 11B, and 11C illustrate examples of lists managed by the relay apparatus.

FIG. 12 illustrates an example of an operation sequence of the communication system.

DESCRIPTION OF THE EMBODIMENTS

[System Configuration]

Figure 1:
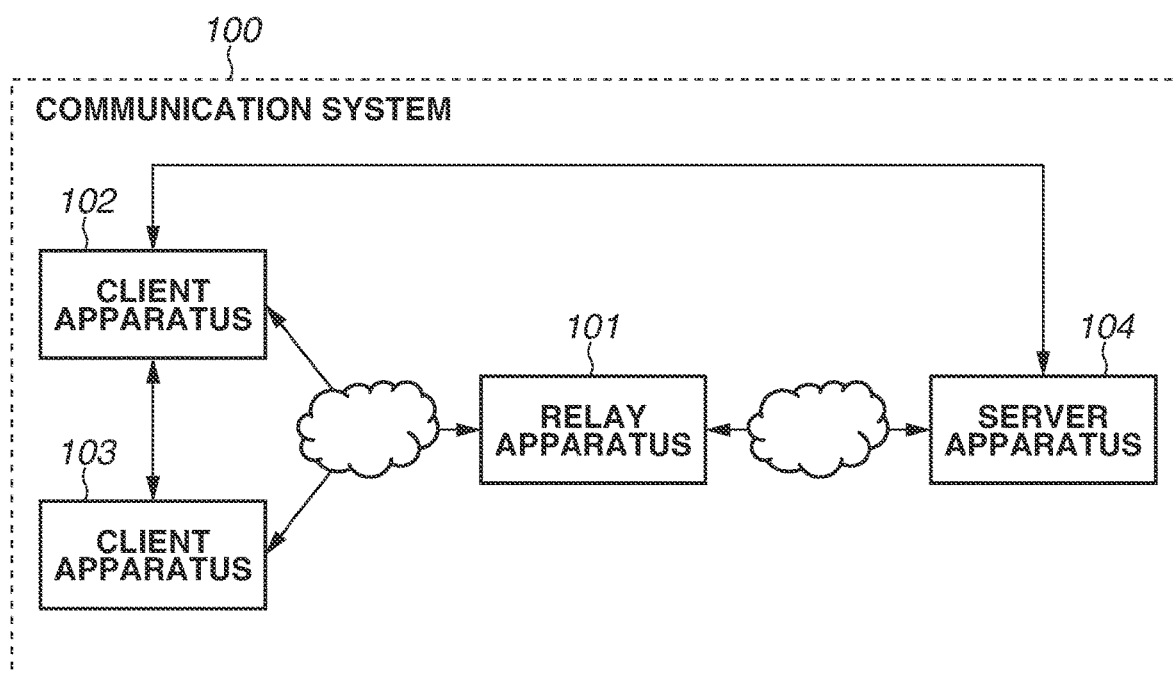
FIG. 1 illustrates an example of a configuration of a communication system.

In the following description, exemplary embodiments will be described with reference to the drawings. First, a first exemplary embodiment will be described. FIG. 1 illustrates a configuration of a communication system 100 according to the present exemplary embodiment. The communication system 100 according to the present exemplary embodiment includes a relay apparatus 101, a client apparatus 102, a client apparatus 103, and a server apparatus 104. The client apparatus 102 and the client apparatus 103 are connected to the server apparatus 104 via the relay apparatus 101 in a wired or wireless manner, and communicate with each other to transmit or receive content data, such as a still image and a moving image, an event notification command, and the like. The communication system 100 illustrated in FIG. 1 includes the two client apparatuses 102 and 103 therein, but the number of client apparatuses connected to the relay apparatus 101 is not limited thereto and may be three or more. Further, the number of server apparatuses 104 connected to the relay apparatus 101 may also be two or more.

In the present exemplary embodiment, the client apparatus 102 and the client apparatus 103 operate as clients defined in Hypertext Transfer Protocol version 2 (HTTP/2). On the other hand, the relay apparatus 101 operates as a server defined in HTTP/2. In other words, each of the client apparatus 102 and the client apparatus 103 transmits an HTTP request to the relay apparatus 101, and the relay apparatus 101 transmits an HTTP response to each of the client apparatus 102 and the client apparatus 103 in response to the received HTTP request.

The server apparatus 104 provides a push service by transmitting data to the client apparatus 102 and the client apparatus 103 via the relay apparatus 101. To realize the push service, for example, a push-type data transmission method, such as the server push prepared as a function of HTTP/2, is used for the transfer of the data from the relay apparatus 101 to the client apparatus 102 and the client apparatus 103. The server apparatus 104 operates as a client defined in Hypertext Transfer Protocol version 1.1 (HTTP/1.1) in the communication with the relay apparatus 101. Then, the relay apparatus 101 operates as a server defined in HTTP/1.1 in the communication with the server apparatus 104. More specifically, the server apparatus 104 transmits a request based on the POST method or the like to the relay apparatus 101 to upload the data targeted for the transmission using the push onto the relay apparatus 101.

Specifically, the relay apparatus 101 is a communication apparatus, such as a personal computer (PC), a network switch, and a router. Specifically, the client apparatus 102 and the client apparatus 103 are each a client apparatus, such as a digital camera, a network camera, a printer, a multi-functional peripheral, a television, a projector, a mobile phone, a smart-phone, and a PC. Further, specific examples of the server apparatus 104 are also similar to the client apparatus 102 and the client apparatus 103. However, how each of the apparatuses in the communication system 100 is embodied is not limited to these examples.

The client apparatus 102, the client apparatus 103, and the server apparatus 104 are connected to the relay apparatus 101 via, for example, a local area network (LAN), a wide area network (WAN), or a combination thereof. A wired LAN in compliance with Ethernet®, a wireless LAN in compliance with the Institute of Electrical and Electronics Engineers (IEEE) 802.11 series, or the like is used as the LAN. For example, the Internet is used as the WAN. Alternatively, the connection may be established based on another communication method such as Bluetooth® and Zigbee®.

The data exchange is also carried out between the client apparatus 102 and the client apparatus 103, and between the client apparatus 102 and the server apparatus 104. In the present exemplary embodiment, the communication system 100 will be described focusing on the example in which this data exchange is carried out by the communication via the LAN or the WAN, but the method for the data exchange is not limited thereto. For example, the data exchange may be carried out by reading out an image or a two-dimensional bar code (e.g., a quick response code (QR Code®)) displayed on one of the apparatuses by the other of the apparatuses, or a user may input information displayed on one of the apparatuses to the other of the apparatuses. Alternatively, the data exchange may be carried out via a not-illustrated information management apparatus by, for example, registering, deleting, and updating the data with, from, and onto the information management apparatus by the client apparatus 102, the server apparatus 104, or the like. The information management apparatus may be, for example, software managed on a cloud or on a server. In the case where the data exchange is carried out via the information management apparatus, an identifier and key information for accessing the information management apparatus may be exchanged between the client apparatus 102 and the server apparatus 104.

In the present exemplary embodiment, the relay apparatus 101 has a function as a push service (PS) defined in the Web Push protocol. Further, the client apparatus 102 and the client apparatus 103 each have a function as a user agent (UA) defined in the Web Push protocol. Then, the server apparatus 104 has a function as an application service (AS) defined in the Web Push protocol.

The communication system 100 operates basically in the following manner. That is, the client apparatus 102 and the client apparatus 103 issue requests to transfer the data to the relay apparatus 101, and the server apparatus 104 transmits, to the relay apparatus 101, the data targeted for the transmission using the push. Then, at a timing according to receipt of the data from the server apparatus 104, the relay apparatus 101 transfers this data to the client apparatuses 102 and 103 that have issued the transfer requests. A detailed operation of each of the apparatuses will be described below.

Specific examples of the communication system 100 include the following system. The client apparatus 102 is a smart-phone, and the server apparatus 104 is a network camera. The client apparatus 102 issues the transfer request to the relay apparatus 101, and waits for transmission of a captured image from the server apparatus 104. The server apparatus 104 images a monitoring area with use of a camera, and transmits the captured image to the relay apparatus 101 when detecting an abnormality in the monitoring area. Then, the relay apparatus 101 transfers the captured image transmitted from the server apparatus 104 to the client apparatus 102. As a result, a user of the client apparatus 102 can notice the abnormality detected in the monitoring area, and confirm the captured image in the monitoring area.

Now, supposing that both the client apparatus 102 and the client apparatus 103 wait for transmission of the same data from the server apparatus 104, a possible consequence in this case is as follows. In this case, if the server apparatus 104 first transmits data addressed to the client apparatus 102 to the relay apparatus 101, and transmits data addressed to the client apparatus 103 to the relay apparatus 101 after that, this means that the server apparatus 104 transmits the same data twice. Employment of such a method leads to an increase in the number of times of the data transmission from the server apparatus 104 according to an increase in the number of client apparatuses to which the data is addressed, thereby resulting in increases in processing loads on the server apparatus 104 and the relay apparatus 101, and a load on the network. Therefore, the communication system 100 according to the present exemplary embodiment causes the same identification information to be shared among transfer requests issued by a plurality of client apparatuses, thereby reducing the number of times of the data transmission from the server apparatus 104 to the relay apparatus 101.

[Configuration of Apparatus]

Figure 2:
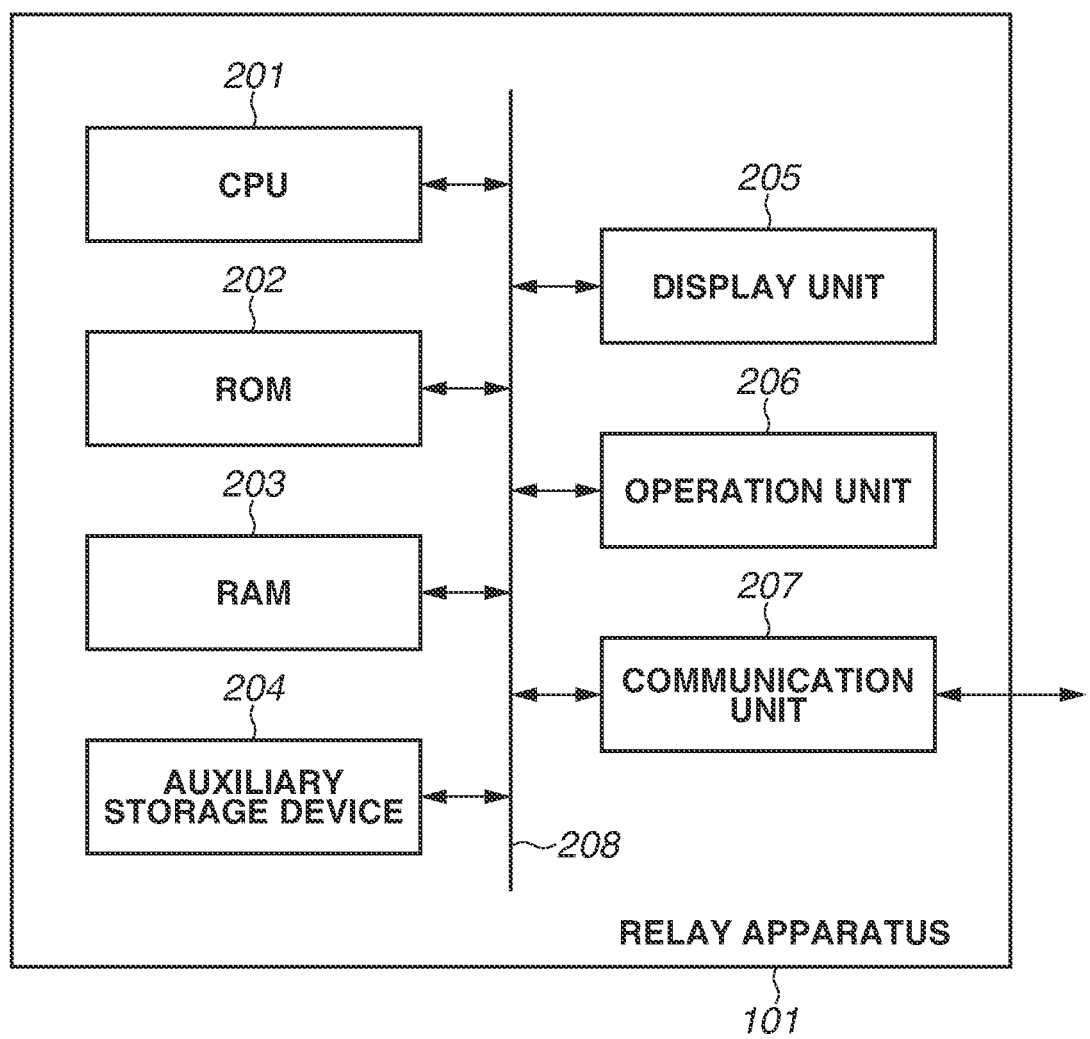
FIG. 2 illustrates an example of a hardware configuration of a relay apparatus.

FIG. 2 is a block diagram illustrating a hardware configuration of the relay apparatus 101. The client apparatus 102, the client apparatus 103, and the server apparatus 104 are also configured in a similar manner to the relay apparatus 101. The relay apparatus 101 includes a central processing unit (CPU) 201, a read only memory (ROM) 202, a random access memory (RAM) 203, an auxiliary storage device 204, a display unit 205, an operation unit 206, a communication unit 207, and a bus 208.

The CPU 201 controls the entire relay apparatus 101 with use of a computer program and data stored in the ROM 202 or the RAM 203. The ROM 202 stores therein a program and a parameter that do not have to be changed. The RAM 203 temporarily stores therein a program and data supplied from the auxiliary storage device 204, data supplied from outside via the communication unit 207, and other data. The auxiliary storage device 204 is embodied by, for example, a hard disk drive, and stores therein content data such as a still image and a moving image.

The display unit 205 is embodied by, for example, a liquid crystal display, and displays thereon, for example, a graphical user interface (GUI) usable for a user to operate the relay apparatus 101. The operation unit 206 is embodied by, for example, a keyboard, a mouse, and/or a touch panel, and inputs various kinds of instructions to the CPU 201 by receiving an operation performed by the user. The communication unit 207 communicates with an external apparatus, such as the client apparatus 102, the client apparatus 103, and the server apparatus 104. In the case where the relay apparatus 101 is connected to the external apparatus in the wired manner, for example, a LAN cable is connected to the communication unit 207. Alternatively, in the case where the relay apparatus 101 has a function of wirelessly communicating with the external apparatus, the communication unit 207 includes an antenna or the like. The bus 208 connects each of the units of the relay apparatus 101 to one another and transmits information among them.

In the present exemplary embodiment, the CPU 201 executes the program, thereby controlling the communication between the relay apparatus 101 and the external apparatus via the communication unit 207, but the communication unit 207 may control at least a part of the communication between the relay apparatus 101 and the external apparatus based on hardware processing. Further, in the present exemplary embodiment, the display unit 205 and the operation unit 206 are disposed inside the relay apparatus 101, but at least one of the display unit 205 and the operation unit 206 may be prepared as a separate apparatus outside the relay apparatus 101. In this case, the CPU 201 operates as a display control unit that controls the display unit 205, and an operation control unit that controls the operation unit 206.

[Communication Sequence]

Figure 3:
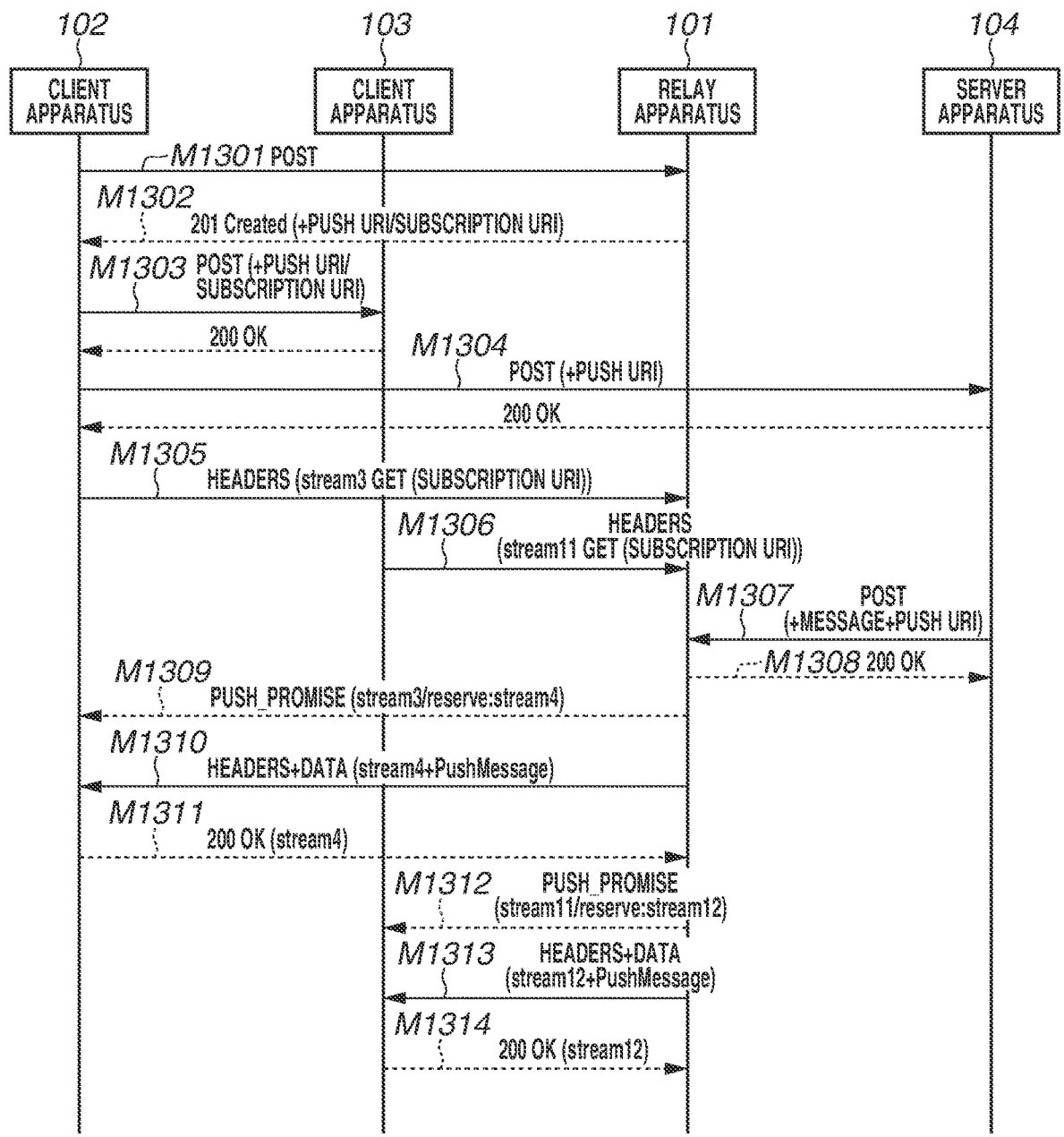
FIG. 3 illustrates an example of an operation sequence of the communication system.

In the following description, a sequence of the communication in the communication system 100 according to the present exemplary embodiment will be described in detail. FIG. 3 illustrates a sequence when the server apparatus 104 transmits the data to the client apparatus 102 and the client apparatus 103 via the relay apparatus 101 using the push. The sequence illustrated in FIG. 3 is started at a timing when a connection is established between each of the client apparatus 102, the client apparatus 103, the server apparatus 104, and the relay apparatus 101. However, the start timing of the processing illustrated in FIG. 3 is not limited to the above-described timing. The CPU 201 of each of the apparatuses in the communication system 100 controls the communication unit 207 and other units, by which each communication process illustrated in FIG. 3 is performed.

In M1301, the client apparatus 102 subscribes to the relay apparatus 101 (requests information of identifiers). The relay apparatus 101 receives the subscription from the client apparatus 102 and generates a push Uniform Resource Identifier (URI) and a push message subscription URI (hereinafter referred to as a subscription URI) corresponding thereto defined in the Web Push protocol. The generated push URI and subscription URI are stored into the RAM 203 of the relay apparatus 101 in a format like an identifier list illustrated in FIG. 11A.

The push URI and the subscription URI are identifiers used by the relay apparatus 101 to identify a transfer destination of the data transmitted from the server apparatus 104 and are issued information generated (issued) by the relay apparatus 101 in response to the request. These identifiers are not limited to the identifiers generated in response to the subscription and may be identifiers determined in response to the subscription among identifiers held by the relay apparatus 101 in advance. In the present exemplary embodiment, the identifier is assumed to be the URI, but may be another type of identifier, such as a Universally Unique Identifier (UUID). Further, in the present exemplary embodiment, the communication system 100 will be described focusing on the example in which the two kinds of information (i.e., the push URI and the subscription URI) are used, but is not limited thereto, and the data targeted for the transfer and the transfer destination may be identified with use of one kind of information. In other words, the push URI and the subscription URI that will be described in the following description may be the same information.

In the present exemplary embodiment, the subscription is assumed to be conducted with use of the POST method of HTTP/1.1, but another method such as the GET method may be used, or communication in compliance with another communication standard, such as File Transfer Protocol (FTP) and WebSocket, may be used. Further, in the present exemplary embodiment, the communication system 100 will be described referring to the example in which the two identifiers, called the push URI and the subscription URI, are generated by the relay apparatus 101 in response to the subscription from the client apparatus 102, but the communication system 100 is not limited thereto. For example, only the push URI may be generated, or a push message subscription set URI defined in the Web Push protocol may be generated in addition to the push URI and the subscription URI.

In M1302, the relay apparatus 101 transmits a response containing the push URI and the subscription URI generated in M1301 in response to the request from the client apparatus 102 in M1301. The client apparatus 102 receives the response and stores the push URI and the subscription URI contained in the received response into the RAM 203 or the like. In the present exemplary embodiment, a status code in this response is assumed to be "201 Created," but is not limited thereto.

In M1303, the client apparatus 102 transmits the push URI and the subscription URI received in M1302 to the client apparatus 103. The client apparatus 103 receives the push URI and the subscription URI, and the client apparatus 103 stores the push URI and the subscription URI into the RAM 203 or the like.

In M1304, the client apparatus 102 transmits the push URI to the server apparatus 104. The server apparatus 104 receives the push URI and stores the push URI into the RAM 203 or the like. In the example illustrated in FIG. 3, the push URI is provided from the client apparatus 102 to the server apparatus 104 with use of the communication in compliance with HTTP/1.1, but the method for providing the data is not limited thereto as already described. For example, the server apparatus 104 may receive the push URI with use of another communication protocol, may receive the push URI with use of the image or the two-dimensional barcode (e.g., QR Code®) displayed on the display unit 205 of the client apparatus 102, or may receive the push URI via the information management apparatus. Alternatively, the user may input the push URI by operating the operation unit 206 of the server apparatus 104. The same also applies to the provision of the data in M1303.

In M1305, the client apparatus 102 transmits a transfer request containing the subscription URI received from the relay apparatus 101 in M1302 to the relay apparatus 101. By the transmission of this transfer request, the client apparatus 102 requests the push-type data transmission by the relay apparatus 101. The relay apparatus 101 receives the transfer request and confirms that the subscription URI contained in the received transfer request matches the subscription URI already stored in the identifier list in the RAM 203. Then, the relay apparatus 101 stores the push URI corresponding to this subscription URI and device information of the client apparatus 102 operating as a transmission source of the transfer request into the RAM 203, for example in a format like a push distribution list illustrated in FIG. 11B.

In M1306, the client apparatus 103 transmits a transfer request containing the subscription URI received from the client apparatus 102 in M1303 to the relay apparatus 101. The relay apparatus 101 receives the transfer request and stores the push URI and device information into the push distribution list in a similar manner to the process of M1305.

In other words, in M1305 and M1306, the relay apparatus 101 receives the two transfer requests containing the same subscription URI from the two apparatuses (i.e., the client apparatus 102 and the client apparatus 103). Then, in the push distribution list held by the relay apparatus 101, a plurality of pieces of device information are associated with the same push URI, as illustrated in FIG. 11B.

In M1307, the server apparatus 104 transmits a distribution message containing the push URI received from the client apparatus 102 in M1304 to the relay apparatus 101. The relay apparatus 101 receives the distribution message containing the push URI from the server apparatus 104 and confirms that the push URI contained in the received distribution message matches the push URI already stored in the identifier list in the RAM 203. This distribution message in the case where the received push URI matches the listed push URI is data that should be transferred to the client apparatus operating as the transmission source of the transfer request containing the subscription URI corresponding to this push URL In M1308, the relay apparatus 101 transmits a distribution response indicating that the request for the push has been received to the server apparatus 104, and the server apparatus 104 receives the distribution response.

In M1309, the relay apparatus 101 searches for device information corresponding to the push URI contained in the distribution message received in M1307 from the push distribution list stored in the RAM 203. Then, the relay apparatus 101 transmits a push reservation containing this push URI to the client apparatus 102 identified from the device information found in the searching. By the transmission of the push reservation, the transmission destination is notified that a message will be transmitted via a push notification later. The client apparatus 102 receives the push reservation and waits until receiving a push message from the relay apparatus 101.

In M1310, the relay apparatus 101 transmits the push message to the client apparatus 102. The client apparatus 102 receives the push message. This push message is a message transmitted from the relay apparatus 101 to the client apparatus 102 by the push in response to the transfer request in M1305. In other words, the push message is transmitted from the relay apparatus 101 at a timing independent of the request from the client apparatus 102. However, the relay apparatus 101 may transmit the message after waiting for a request from the client apparatus 102 instead of the push-type data transmission in M1301.

The push message transmitted from the relay apparatus 101 at this time is information according to the distribution message transmitted from the server apparatus 104 in M1307. Further, this push message is also information transferred by the relay apparatus 101 in response to the transfer request in M1305 that contains the subscription URI corresponding to the push URI contained in the distribution message. The distribution message and the push message may contain the same data or may contain different data. In M1311, the client apparatus 102 transmits, to the relay apparatus 101, a push response indicating that the push message has been received. The relay apparatus 101 receives the push response.

In M1312, the relay apparatus 101 transmits, to the client apparatus 103 identified from the device information corresponding to the push URI contained in the distribution message received in M1307, a push reservation containing this push URI in a similar manner to M1309. The client apparatus 103 receives the push reservation, and waits until receiving a push message from the relay apparatus 101.

In M1313, the relay apparatus 101 transmits the push message to the client apparatus 103, and the client apparatus 103 receives the push message. The push message transmitted at this time is information according to the distribution message transmitted from the server apparatus 104 in M1307. The push message transmitted in M1313 and the push message transmitted in M1310 may be the same message or may contain different data according to the transmission destination. In M1314, the client apparatus 103 transmits a push response to the relay apparatus 101, and the relay apparatus 101 receives the push response.

With these exchanges, a series of communication processes in the communication system 100 is ended. The sequence described with reference to FIG. 3 can be summarized in the following manner. The relay apparatus 101 generates the subscription URI for transferring the data transmitted from the server apparatus 104 and the push URI corresponding to this subscription URI (M1301). The client apparatus 102 and the client apparatus 103 acquire the same subscription URI (M1302 and M1303) and transmit the transfer requests for requesting the push-type data transmission by the relay apparatus 101 (M1305 and M1306). The server apparatus 104 acquires the push URI (M1304) and transmits the data based on the acquired push URI to the relay apparatus 101 (M1307). The relay apparatus 101 transfers the data received from the server apparatus 104 to the client apparatus 102 and the client apparatus 103 that have transmitted the transfer requests based on the subscription URI corresponding to the push URI of this data (M1310 and M1313).

In this manner, according to the communication system 100 of the present exemplary embodiment, the push-type data transmission to both the client apparatus 102 and the client apparatus 103 can be realized by transmitting the data from the server apparatus 104 to the relay apparatus 101 once. In other words, when the server apparatus 104 transmits the messages to the client apparatus 102 and the client apparatus 103 via the relay apparatus 101, the communication system 100 can omit the distribution message to be transmitted from the server apparatus 104 to the relay apparatus 101. By this omission, the communication system 100 can reduce a processing load regarding the communication between the server apparatus 104 and the relay apparatus 101, and the communication system 100 also acquires an effect of being able to reduce a memory capacity used for the server apparatus 104 to manage the push URI and the subscription URI.

Further, in the present configuration, unsubscription for deleting the already used push URI and subscription URI stored in the identifier list in the relay apparatus 101 may be conducted by only any one of the client apparatus 102 and the client apparatus 103. Therefore, the communication system 100 also produces an effect of being able to reduce processing loads on the client apparatus 102 and the client apparatus 103. Further, according to the communication system 100 of the present exemplary embodiment, the same data transmitted from the server apparatus 104 is received by both the client apparatus 102 and the client apparatus 103. This configuration makes possible, for example, such a use case that, when the client apparatus 102 is a PC placed at the user's home and the client apparatus 103 is a mobile terminal that the user carries with him/her, the user views data received by the PC when being at home and views the received data on the mobile terminal when going out.

[Operation Flow of Apparatus]

Next, an operation flow of each of the apparatuses in the communication system 100 will be described. The CPU 201 of each of the apparatuses develops the program stored in the ROM 202 into the RAM 203 and executes this program, by which processing procedures that will be described below with reference to FIGS. 4 to 10 are realized. However, at least a part of the processing procedures that will be described below may be realized by dedicated hardware different from the CPU 201.

Figure 4:
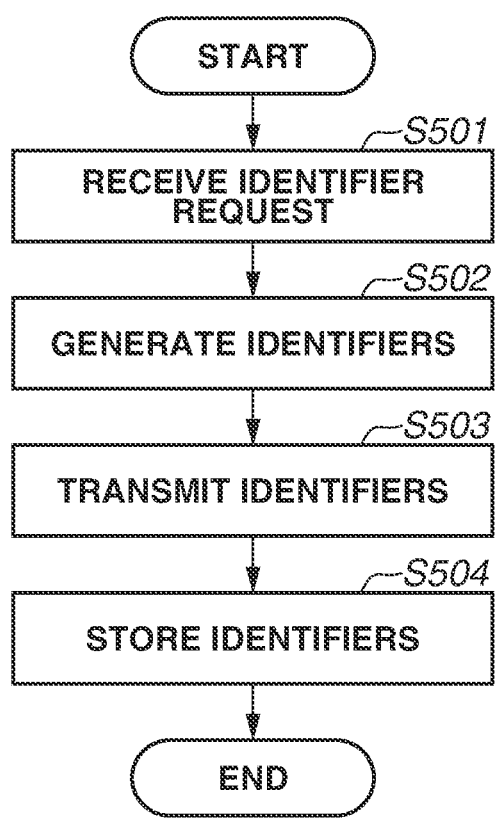
FIG. 4 is a flowchart illustrating an operation regarding generation of identifiers by the relay apparatus.

FIG. 4 is a flowchart illustrating processing when the relay apparatus 101 generates the identifiers. The processing illustrated in FIG. 4 is started at a timing when the relay apparatus 101 receives the identifier request (the subscription) from the client apparatus 102 or the client apparatus 103. In S501, the relay apparatus 101 receives the identifier request from the client apparatus 102 or the client apparatus 103. In S502, the relay apparatus 101 generates the subscription URI and the push URI as the identifiers. In S503, the relay apparatus 101 transmits the identifiers to the client apparatus 102 or the client apparatus 103 operating as the transmission source of the identifier request in S501. In S504, the relay apparatus 101 stores the identifiers generated in S502 into the identifier list in the RAM 203 illustrated in FIG. 11A.

Figure 5:
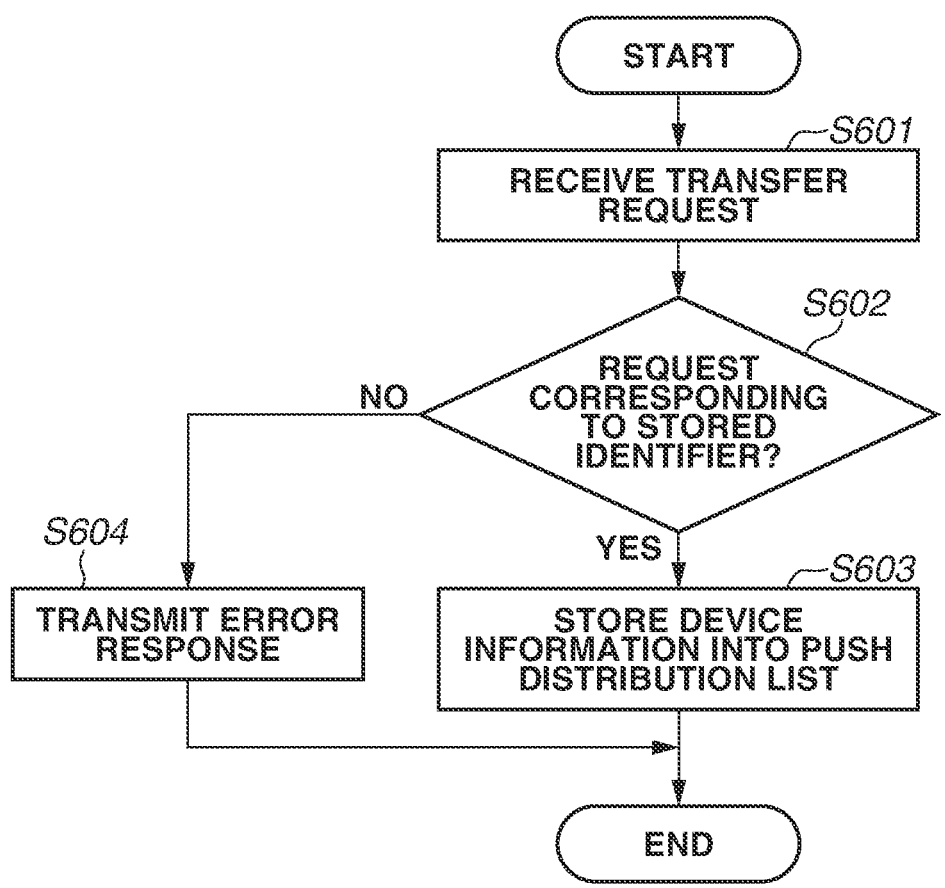
FIG. 5 is a flowchart illustrating an operation regarding reception of a transfer request by the relay apparatus.

FIG. 5 is a flowchart illustrating processing performed when the relay apparatus 101 receives the transfer request. The processing illustrated in FIG. 5 is started at a timing when the relay apparatus 101 receives the transfer request from the client apparatus 102 or the client apparatus 103. In S601, the relay apparatus 101 receives the transfer request containing the identifier from the client apparatus 102 or the client apparatus 103. In S602, the relay apparatus 101 compares the identifier received in S601 and the identifier stored in the identifier list in S504. Then, if the received identifier is contained in the identifier list (YES in S602), the processing proceeds to S603. If the received identifier is not contained in the identifier list (NO in S602), the processing proceeds to S604.

In S603, the relay apparatus 101 stores the device information of the client apparatus operating as the transmission source of the transfer request received in S601 into the push distribution list in the RAM 203 illustrated in FIG. 11B. The device information according to the present exemplary embodiment is information that allows the relay apparatus 101 to uniquely identify the client apparatus. More specifically, the device information is a device identification (ID) of the client apparatus, a media access control (MAC) address, identification information of the connection between the client apparatus and the relay apparatus 101, or the like. In S604, the relay apparatus 101 transmits an error response to the client apparatus 102 or the client apparatus 103 operating as the transmission source of the transfer request in S601.

Figure 6:
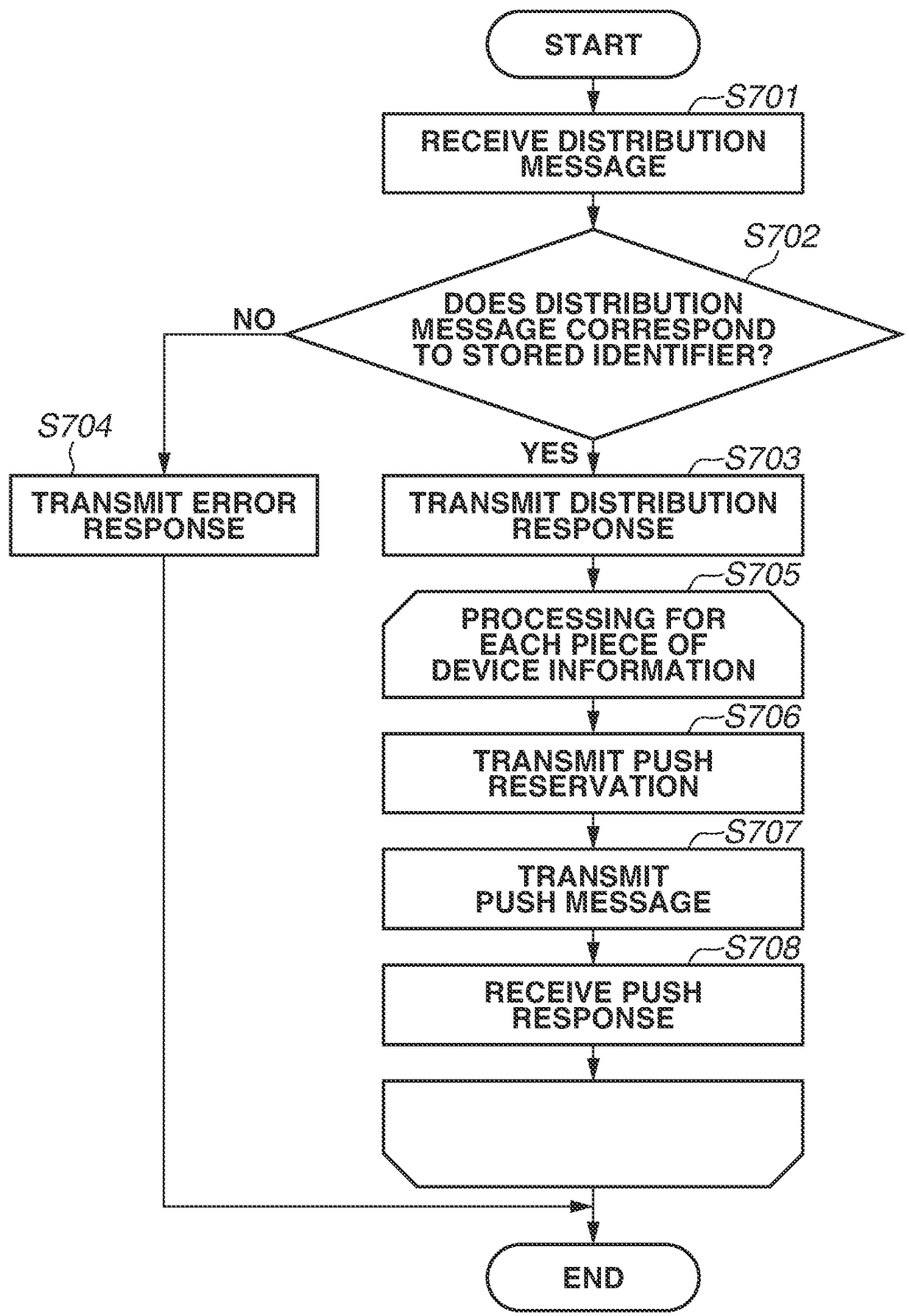
FIG. 6 is a flowchart illustrating an operation regarding transmission of a push message by the relay apparatus.

FIG. 6 is a flowchart illustrating processing in which the relay apparatus 101 transmits the push message to each of the client apparatus 102 and the client apparatus 103. The processing illustrated in FIG. 6 is started at a timing when the relay apparatus 101 receives the distribution message from the server apparatus 104. In S701, the relay apparatus 101 receives the distribution message containing the identifier from the server apparatus 104. In S702, the relay apparatus 101 compares the identifier received in S701 and the identifier stored in the identifier list in S504. If the received identifier is contained in the identifier list (YES in S702), the processing proceeds to S703. If the received identifier is not contained in the identifier list (NO in S702), the processing proceeds to S704.

In S703, the relay apparatus 101 transmits the distribution response to the server apparatus 104. In S704, the relay apparatus 101 transmits an error response to the server apparatus 104. In S705, the relay apparatus 101 performs processes of S706 to S708 with respect to each piece of device information corresponding to the identifier received in S701 in the push distribution list stored in S603. In S706, the relay apparatus 101 transmits the push reservation to the client apparatus corresponding to the targeted device information. In S707, the relay apparatus 101 transmits the push message to the client apparatus corresponding to the targeted device information. In S708, the relay apparatus 101 receives the push response from the client apparatus set as the transmission destination of the push message in S707.

If the push distribution list stores therein a plurality of pieces of device information corresponding to the push URI received in S701, in S705 to S708, the relay apparatus 101 transfers the distribution message received in S701 to each of the plurality of client apparatuses. Now, the push distribution list storing therein the plurality of pieces of device information corresponding to the same push URI means that the relay apparatus 101 has received the transfer requests based on the same subscription URI from the plurality of client apparatuses. In the example described above with reference to FIG. 3, both the device information of the client apparatus 102, and the device information of the client apparatus 103 to which the identifiers are not directly transmitted from the relay apparatus 101, are stored in the push distribution list in response to the transfer requests in M1350 and M1306, respectively.

Figure 7:
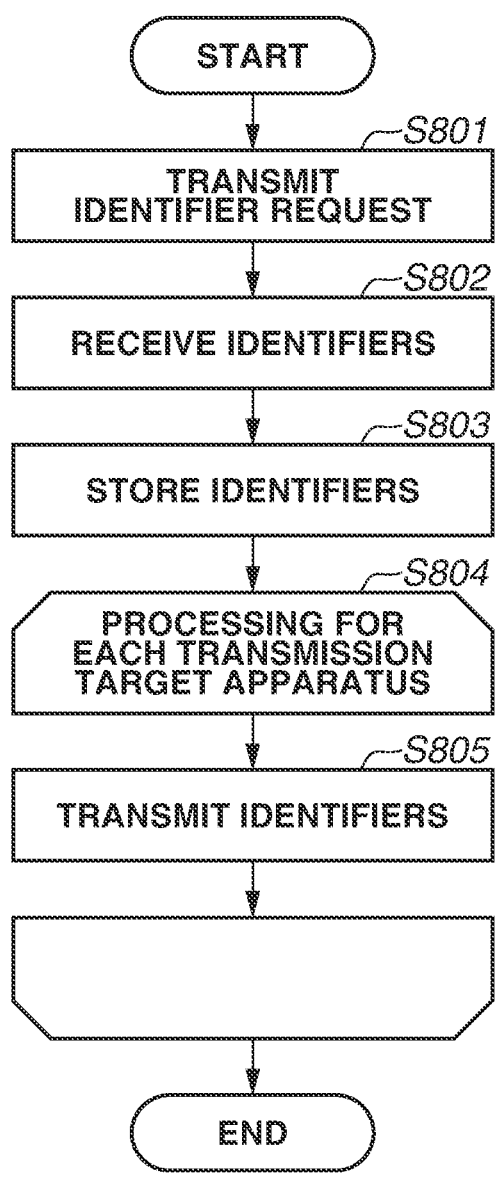
FIG. 7 is a flowchart illustrating an operation regarding reception and transmission of the identifiers by a client apparatus.

FIG. 7 is a flowchart illustrating processing in which the client apparatus 102 receives the identifiers from the relay apparatus 101 and transmits the identifier(s) to the client apparatus 103 and the server apparatus 104. The processing illustrated in FIG. 7 is started at, for example, a timing when the client apparatus 102 is instructed to issue the identifier request by an operation of the user or the like. However, the start timing of the processing illustrated in FIG. 7 is not limited to the above-described timing.

In S801, the client apparatus 102 transmits the identifier request to the relay apparatus 101. In S802, the client apparatus 102 receives the identifiers from the relay apparatus 101. In S803, the client apparatus 102 stores the identifiers received in S802 into an identifier list in the RAM 203 that the client apparatus 102 itself includes. In S804, the client apparatus 102 performs a process of S805 with respect to each of the transmission target apparatuses. The transmission target apparatuses according to the present exemplary embodiment refer to the client apparatus 103 and the server apparatus 104, but are not limited thereto. For example, the information management apparatus (not illustrated) for managing the identifier may be set as the transmission target apparatus, and the client apparatus 102 may exchange the identifier(s) between the client apparatus 102 and the other apparatus via the information management apparatus. In S805, the client apparatus 102 transmits the identifier(s) to the transmission target apparatus.

Figure 8:
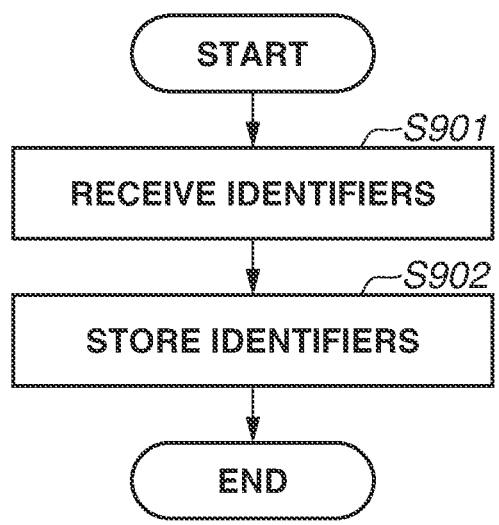
FIG. 8 is a flowchart illustrating an operation regarding acquisition of the identifiers by the client apparatus.

FIG. 8 is a flowchart illustrating processing in which the client apparatus 103 acquires the identifiers from the client apparatus 102. The processing illustrated in FIG. 8 is started at a timing when the client apparatus 103 receives the identifiers from the client apparatus 102. In S901, the client apparatus 103 receives the identifiers from the client apparatus 102. In S902, the client apparatus 103 stores the identifiers received in S901 into an identifier list in the RAM 203 that the client apparatus 103 itself includes. Processing in which the server apparatus 104 acquires the identifier from the client apparatus 102 is also performed in a similar manner to the processing described with reference to FIG. 8.

Figure 9:
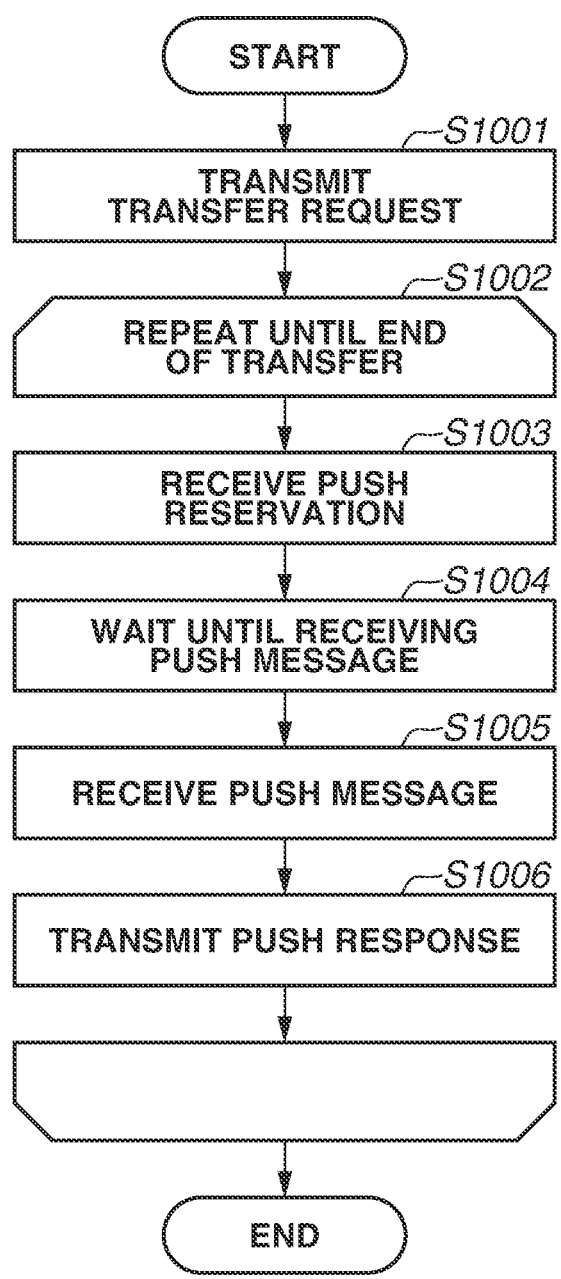
FIG. 9 is a flowchart illustrating an operation regarding reception of the push message by the client apparatus.

FIG. 9 is a flowchart illustrating processing in which the client apparatus 102 receives the push message from the relay apparatus 101. The processing illustrated in FIG. 9 is started at, for example, a timing when the client apparatus 102 is instructed to issue the transfer request by an operation of the user or the like. However, the start timing of the processing illustrated in FIG. 9 is not limited to the above-described timing. In S1001, the client apparatus 102 transmits the transfer request to the relay apparatus 101. In S1002, the client apparatus 102 repeats processes of S1003 to S1006 until the transfer from the relay apparatus 101 is ended. In the present exemplary embodiment, the transfer is ended, for example, when the client apparatus 102 is instructed to end the reception of the push message by an operation of the user or the like, or when the client apparatus 102 receives a message indicating the end of the transfer from the relay apparatus 101. The condition for the end of the transfer is not limited thereto.

In S1003, the client apparatus 102 receives the push reservation containing the identifier from the relay apparatus 101. In S1004, the client apparatus 102 waits until receiving the push message from the relay apparatus 101. In S1005, the client apparatus 102 receives the push message from the relay apparatus 101. In S1006, the client apparatus 102 transmits the push response to the relay apparatus 101. Processing in which the client apparatus 103 receives the push message from the relay apparatus 101 is also performed in a similar manner to the processing described with reference to FIG. 9.

Figure 10:
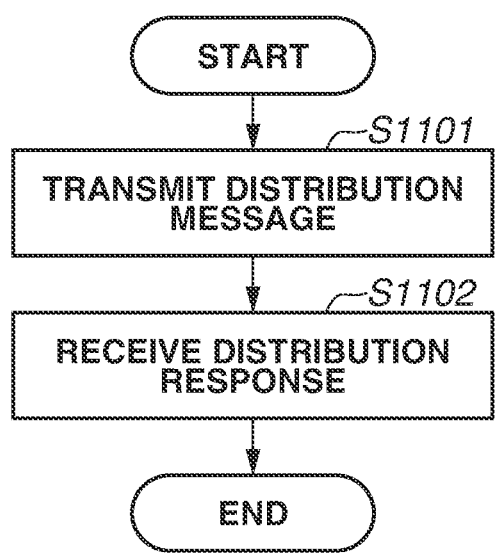
FIG. 10 is a flowchart illustrating an operation regarding transmission of a message by the server apparatus.

FIG. 10 is a flowchart illustrating processing in which the server apparatus 104 transmits the distribution message to the relay apparatus 101. The processing illustrated in FIG. 10 is started at, for example, a timing when the server apparatus 104 is instructed to transmit the data by an operation of the user or the like, or a timing when the server apparatus 104 detects a predetermined event with use of a sensor or the like. However, the start timing of the processing illustrated in FIG. 10 is not limited to the above-described timings.

In S1101, the server apparatus 104 transmits the distribution message to the relay apparatus 101. In S1102, the server apparatus 104 receives the distribution response from the relay apparatus 101.

[Exemplary Modifications]

The above-described exemplary embodiment can be modified in various manners within a range that does not depart from the spirit thereof. For example, when transmitting the subscription to the relay apparatus 101, the client apparatus 102 may transmit authentication information together therewith. The relay apparatus 101 stores the received authentication information and the identifiers in association with each other. Then, when receiving a message for the unsubscription (a request to delete the identifiers stored in the identifier list) from the other apparatus, the relay apparatus 101 may delete the already stored identifiers only if the authentication information received at the time of the subscription is contained in this message. By this configuration, the communication system 100 acquires an effect of being able to prevent the identifiers already registered with the relay apparatus 101 from being deleted by the other apparatus at a timing unintended by the user of the client apparatus 102. Further, the client apparatus 102 may be able to switch whether to transmit the authentication information together when transmitting the identifiers to the client apparatus 103. This configuration allows the client apparatus 102 to control whether to permit the unsubscription by the client apparatus 103.

Further, in the present exemplary embodiment, the communication system 100 has been described focusing on the example in which the two apparatuses (i.e., the client apparatus 102 and the client apparatus 103) receive the push messages from the relay apparatus 101 with use of the same identifier. However, the communication system 100 is not limited thereto, and three or more client apparatuses may receive the push messages from the relay apparatus 101 with use of the same identifier. Further, the client apparatus 102 and the client apparatus 103 may receive data pushed from a plurality of server apparatuses. In this case, a different identifier may be used for each server apparatus. In the present exemplary embodiment, the identifier is assumed to be contained in the transmitted transfer request and data, but does not necessarily have to be contained therein as long as the transfer request and the data based on the identifier are transmitted. For example, data associating the transfer request and the identifier with each other may be transmitted separately from this transfer request.

Further, in the present exemplary embodiment, the communication system 100 has been described referring to the example in which the relay apparatus 101 transfers the data received from the server apparatus 104 to all of the client apparatuses operating as the transmission sources of the transfer requests. However, the communication system 100 is not limited thereto, and the relay apparatus 101 may transfer the data received from the server apparatus 104 to only a part of the client apparatuses among the plurality of client apparatuses operating as the transmission sources of the transfer requests. The relay apparatus 101 may determine whether to transfer the data to all of the client apparatuses or to transfer the data to only a part of the client apparatuses based on, for example, information added to the data transmitted from the server apparatus 104. By this configuration, the communication system 100 can reduce a processing load regarding the data transfer of the relay apparatus 101, for example, when the data from the server apparatus 104 needs to be transmitted to only at least any one of the client apparatus 102 and the client apparatus 103. The method for determining whether to transfer the data to all of the client apparatuses or to transfer the data to only a part of the client apparatuses is not limited thereto, and this determination may be made based on information transmitted from the client apparatus 102, the processing load on the relay apparatus 101, and/or the like.

Further, in the present exemplary embodiment, the relay apparatus 101 is configured to transmit the error response if receiving the transfer request or the distribution message corresponding to an identifier not contained in the identifier list (S604 and S704). However, the timing of transmitting the error response is not limited thereto. For example, the relay apparatus 101 may transmit the error response to the client apparatus if receiving the transfer requests from a predetermined or larger number of client apparatuses. Further or alternatively, the relay apparatus 101 may transmit the error response if receiving the transfer requests corresponding to a predetermined or larger number of subscription URIs or if receiving the transfer requests corresponding to the same subscription URI from a predetermined or larger number of client apparatuses. By this configuration, the communication system 100 can prevent or cut down an excessive increase in the processing load on the relay apparatus 101 regarding the transmission of the push message. The above-described predetermined number may be, for example, set by a user operation performed onto the relay apparatus 101 or automatically set according to the processing load on the relay apparatus 101 and/or the like.

In the present exemplary embodiment, the relay apparatus 101 is configured to notify the other apparatus of the error by transmitting the error response, but the method for the error notification is not limited thereto. For example, the relay apparatus 101 may notify the user of the occurrence of the error by displaying an image indicating the error on the display unit 205. Further or alternatively, the relay apparatus 101 may notify the user of the error by lightning up a light-emitting diode (LED) lamp and/or emitting a sound from a speaker.

Further, in the present exemplary embodiment, the communication between the relay apparatus 101, the client apparatus 102, and the client apparatus 103 is assumed to be carried out with use of the connection and the stream defined in HTTP/2. On the other hand, the communication between the relay apparatus 101 and the server apparatus 104 is assumed to comply with HTTP/1.1. However, the method for the communication carried out in the communication system 100 is not limited to them. For example, the communication between the relay apparatus 101 and the server apparatus 104 may also be communication in compliance with HTTP/2. Further, the employed communication standard is not limited to HTTP/1.1 and HTTP/2, and the communication may be carried out in compliance with another communication standard, such as WebSocket and Quick User Datagram Protocol (UDP) International Connections (QUIC). In this case, the communication is carried out with use of a message and a logical connection in a format according to each standard. Further, in the present exemplary embodiment, the communication system 100 has been described referring to the example in which the push-type data transmission based on the Web Push protocol is carried out, but is not limited thereto. The present exemplary embodiment can also be applied to another protocol for transmitting/receiving the push notification. Further, the present exemplary embodiment can also be applied to a protocol that does not use the push.

Further, in the present exemplary embodiment, the communication system 100 has been described referring to the example in which the client apparatus 102 receives the identifiers from the relay apparatus 101, and in which the client apparatus 102 notifies the client apparatus 103 and the server apparatus 104 of the received identifier(s), as illustrated in FIG. 3. Then, the communication system 100 is configured in such a manner that the client apparatus 103 acquires the data transmitted from the server apparatus 104 to the relay apparatus 101 with use of this identifier received from the client apparatus 102. However, the method for sharing the identifiers among the individual apparatuses in the communication system 100 is not limited thereto. For example, the server apparatus 104 may receive the identifiers from the relay apparatus 101 and notify the client apparatus 102 and the client apparatus 103 of the received identifiers. In the following description, an example of a communication sequence in the communication system 100 in this case will be described with reference to FIG. 12.

The sequence illustrated in FIG. 12 is started at a timing when the connection is established between each of the client apparatus 102, the client apparatus 103, and the server apparatus 104, and the relay apparatus 101. However, the start timing of the processing illustrated in FIG. 12 is not limited to the above-described timing. The CPU 201 of each of the apparatuses in the communication system 100 controls the communication unit 207 or the like, by which each communication process illustrated in FIG. 12 is performed. Processes of M1405 to M1414 are similar to the processes of M1305 to M1314 illustrated in FIG. 3, whereby descriptions thereof will be omitted here.

In M1401, the server apparatus 104 subscribes to the relay apparatus 101 (requests the information of the identifiers). The relay apparatus 101 receives the subscription from the server apparatus 104 and generates the push URI and the subscription URI corresponding thereto. In M1402, the relay apparatus 101 transmits the response containing the push URI and the subscription URI in response to the request from the server apparatus 104 in M1401. The server apparatus 104 receives the response and stores the push URI and the subscription URI into the RAM 203 or the like.

In M1403, the server apparatus 104 transmits the push URI and the subscription URI to the client apparatus 102. The client apparatus 102 receives the push URI and the subscription URI, and the client apparatus 102 stores the push URI and the subscription URI into the RAM 203 or the like. In M1404, the server apparatus 104 transmits the push URI and the subscription URI to the client apparatus 103. The client apparatus 103 receives the push URI and the subscription URI, and the client apparatus 103 stores the push URI and the subscription URI into the RAM 203 or the like.

Both the identifiers (the push URI and the subscription URI) transmitted in M1403, and the identifiers transmitted in M1404, are the identifiers transmitted from the relay apparatus 101 in M1402. In other words, in M1403 and M1404, the server apparatus 104 transmits the same identifiers to the client apparatus 102 and the client apparatus 103. The server apparatus 104 may transmit only the subscription URI without transmitting the push URI in M1403 and M1404.

By the above-described processing, the identifiers can be shared among the individual apparatuses in the communication system 100 in a similar manner to the processes of M1301 to M1304 described with reference to FIG. 3. Then, in processes in and after M1405, the client apparatus 102 and the client apparatus 103 acquire the push messages from the relay apparatus 101 with use of the identifier transmitted in M1403 and M1404, respectively. According to such a method, the data transmission to the plurality of apparatuses by the push can be realized by transmitting, to the relay apparatus 101, the data that the server apparatus 104 should transmit to the client apparatus 102 and the client apparatus 103 only once in M1407. To specify the transfer destinations of the distribution message, the distribution message transmitted from the server apparatus 104 in M1407 contains the push URI corresponding to the subscription URI transmitted to the client apparatuses 102 and 103 in M1403 and M1404, respectively.

According to the above-described exemplary embodiment, the communication system 100 can prevent or cut down the increase in the processing load on the server apparatus regarding the data transmission to the communication apparatus when transmitting the data from the server apparatus to the plurality of client apparatuses via the communication apparatus.

[Notification of Delivery Confirmation]

In the above-described exemplary embodiment, the communication system 100 has been described without referring to a message for notifying the server apparatus 104 of a confirmation of the delivery of the push message, but, in the communication in compliance with the Web Push protocol, the communication apparatus (the push service (PS)) transfers the data transmitted from the server apparatus (the application server (AS)) to the client apparatus (the user agent (UA)). This transfer realizes the push-type data transmission from the AS to the UA. Further, when the data is delivered from the PS to the UA, the PS transmits, to the AS, a message (receipt) notifying the AS of a confirmation of the delivery.

Regarding a method for allowing the communication apparatus to appropriately notify the server apparatus that the data has been delivered to the client apparatuses set as the transmission destinations when the data is transmitted from the server apparatus to the plurality of client apparatuses via the communication apparatus, this method has not been implemented in every case. For example, supposing that the data is transmitted from the AS to the plurality of UAs via the PS in the communication in compliance with the Web Push protocol, a possible consequence in this case is as follows. In this case, if the receipt is transmitted from the PS to the AS only when the data is transmitted to any of the UAs for the first time, it is difficult for the AS to determine whether the data has been delivered to all of the UAs. In the following description, an exemplary embodiment for solving such difficulties will be described.

The communication system 100 according to the present exemplary embodiment basically operates in the following manner. That is, the client apparatus 102 and the client apparatus 103 issue the requests to transfer the data to the relay apparatus 101, and the server apparatus 104 transmits the data targeted for the transmission using the push to the relay apparatus 101. Then, at the timing according to the reception of the data from the server apparatus 104, the relay apparatus 101 transfers this data to the client apparatuses 102 and 103 that have issued the transfer requests. Further, upon receiving confirmation responses indicating that the transferred data has been received from the client apparatus 102 and the client apparatus 103, the relay apparatus 101 transmits a notification of a delivery confirmation to the server apparatus 104. In the present exemplary embodiment, the notification of the delivery confirmation is assumed to be transmitted as a push message receipt (hereinafter referred to as a receipt) defined in the Web Push protocol. However, the format of the notification is not limited thereto, and the format may be a different format as long as the notification is realized by a method allowing the server apparatus 104 to recognize that the data has been correctly delivered to the client apparatuses 102 and 103.

Now, in a case where the transfer destination of the data from the relay apparatus 101 is only the client apparatus 102, the relay apparatus 101 needs only to transmit the receipt to the server apparatus 104 when receiving the confirmation response from the client apparatus 102. On the other hand, it is also conceivable that the data from the relay apparatus 101 is addressed to a plurality of transfer destinations, like the client apparatus 102 and the client apparatus 103. In this case, if the relay apparatus 101 transmits the receipt to the server apparatus 104 only when receiving the confirmation response for the first time, it is difficult for the server apparatus 104 to determine whether the data has been delivered to all of the transfer destinations. Therefore, in some embodiments, the relay apparatus 101 transmits the notification of the delivery confirmation to the server apparatus 104 after receiving the confirmation responses from the plurality of transfer destinations, thereby allowing the server apparatus 104 to determine that the data has been delivered to this plurality of transfer destinations.

Further, some embodiments transmit a similar receipt to the server apparatus 104 every time the relay apparatus 101 receives the confirmation response from each of the plurality of client apparatuses. However, in this case, it may be difficult for the server apparatus 104 to determine whether the data has been delivered to all of the transfer destinations unless the server apparatus 104 knows the number of client apparatuses set as the transfer destinations managed by the relay apparatus 101. Therefore, as will be described in the present exemplary embodiment, the relay apparatus 101 transmits, to the server apparatus 104, a specific notification of the delivery confirmation after receiving the confirmation responses from the plurality of transfer destinations, thereby allowing the server apparatus 104 to easily determine that the data has been delivered to this plurality of transfer destinations.

Then, upon receiving the notification of the delivery confirmation from the relay apparatus 101, the server apparatus 104 transmits the next data that should be transmitted to, for example, the client apparatus 102 and the client apparatus 103 to the relay apparatus 101. On the other hand, if the notification of the delivery confirmation is not received from the relay apparatus 101 within a predetermined time period, or if the error response is received from the relay apparatus 101, the server apparatus 104 performs error processing, such as retransmission of the data. Further, in such a case that the server apparatus 104 is notified of a cause of the failure to deliver the data from the relay apparatus 101 together with the error response, the server apparatus 104 may control a type, a size, and/or the like of the transmission data so as to resolve the cause of the failure that the server apparatus 104 is notified of.

[Communication Sequence]

In the following description, a sequence of the communication in the communication system 100 according to the present exemplary embodiment will be described in detail with reference to FIG. 13. Processes similar to the communication sequence described above with reference to FIG. 3 will be identified by the same numbers. In the sequence illustrated in FIG. 13, the processes of M1307 and M1308 illustrated in FIG. 3 is replaced with processes of M1501 to M1506. Further, processes of M1507 and M1508 are added. In the following description, differences from the sequence illustrated in FIG. 3 will be described.

In M1501, the server apparatus 104 requests the relay apparatus 101 to issue the notification of the delivery confirmation corresponding to the data transmitted from the server apparatus 104 (for example, a distribution message transmitted in M1505) from now on. In M1502, the relay apparatus 101 generates a receipt subscription URI and a push message URI in response to the notification request received in M1501. Then, the relay apparatus 101 transmits the generated receipt subscription URI and push message URI to the server apparatus 104 as a response to the notification request together with a status code of HTTP (for example, 200 Accepted). However, the information transmitted from the relay apparatus 101 to the server apparatus 104 as the response to the notification request is not limited thereto, and only the push message URI may be transmitted or another identifier may be transmitted. If rejecting the request to issue the notification of the delivery confirmation, the relay apparatus 101 transmits a different status code (for example, 400 or 404).

In M1503, the server apparatus 104 issues a receipt request for receiving the receipt from the relay apparatus 101 by the push-type data transmission. This receipt request is transmitted from the server apparatus 104 to the relay apparatus 101 by, for example, the GET method of HTTP, and contains the push URI corresponding to the data targeted for the confirmation of the delivery thereof using the receipt. Further, the receipt request transmitted from the server apparatus 104 contains the receipt subscription URI acquired from the relay apparatus 101 in M1502 and a push policy. The push policy is specifying information for specifying, for example, the number of client apparatuses that should be set as the transfer destinations of the data that the relay apparatus 101 receives from the server apparatus 104. The push policy, for example, may be written in a field of HTTP headers of the receipt request in the form of PUSH-MODE: all, or may be written in a body section. Now, PUSH-MODE is an extended HTTP header for indicating a push method, and "all" indicates that the data is pushed to all of the subscribing client apparatuses.

Upon receiving the receipt request from the server apparatus 104, the relay apparatus 101 generates a push policy list like an example illustrated in FIG. 11C. With use of the push URI contained in the receipt request as a key, the device information of the server apparatus 104 operating as a transmission source of the receipt request, the receipt subscription URI contained in the receipt request, and the push policy are stored into the list in association with one another as the same entry. Further, the push message URI generated together with this receipt subscription URI in M1502 is also stored into the same entry. Details of the push policy will be described below.

In M1504, the relay apparatus 101 transmits, to the server apparatus 104, a push reservation containing the push URI corresponding to the receipt subscription URI contained in the receipt request received in M1503. By the transmission of the push reservation, the server apparatus 104 is notified that the receipt will be pushed to the server apparatus 104 later. In the example illustrated in FIG. 13, a PUSH_PROMISE frame for reserving the push of the receipt with use of a stream having a stream number of 82 is transmitted with use of a stream having a stream number of 13. The stream and the PUSH_PROMISE frame are defined to be used in the communication in compliance with HTTP/2 by the standard specification.

In M1505, the server apparatus 104 transmits, to the relay apparatus 101, the distribution message containing the push URI received from the client apparatus 102 in M1304. The relay apparatus 101 receives the distribution message containing the push URI from the server apparatus 104 and confirms that the push URI contained in the received distribution message matches the push URI already stored in the identifier list in the RAM 203. This distribution message in the case where the received push URI matches the listed push URI is the data that should be transferred to the client apparatus operating as the transmission source of the transfer request containing the subscription URI corresponding to this push URI. In M1506, the relay apparatus 101 transmits the distribution response indicating that the request for the push has been received to the server apparatus 104, and the server apparatus 104 receives the distribution response.

In M1507, the relay apparatus 101 transmits, to the server apparatus 104, a receipt having a status code of 100 Continue with use of the stream reserved in M1504 by the push-type data transmission. The receipt having the status code of 100 Continue transmitted at this time is a provisional response indicating that the push message has been delivered to only one of the client apparatus 102 and the client apparatus 103 set as the transfer destinations. The receipt transmitted at this time may contain, for example, information for identifying the client apparatus 102 to which the push message has been delivered. By this information, the server apparatus 104 can learn which client apparatus the data has been delivered to.

In M1508, the relay apparatus 101 transmits, to the server apparatus 104, a receipt having a status code of 204 No Content with use of the stream reserved in M1504 by the push-type data transmission. The receipt having the status code of 204 No Content transmitted at this time is the notification of the delivery confirmation indicating that the push messages have been delivered to both the client apparatus 102 and the client apparatus 103 set as the transfer destinations. The receipt transmitted at this time may contain, for example, information for identifying all of the transfer destinations to which the push messages have been delivered (the client apparatus 102 and the client apparatus 103). By this information, the server apparatus 104 can learn which client apparatus the data has eventually been delivered to.

Main points of the sequence described with reference to FIG. 13 can be summarized in the following manner. The server apparatus 104 transmits, to the relay apparatus 101, the data that should be transferred to the client apparatus 102 and the client apparatus 103 (M1505). The relay apparatus 101 transfers the data received from the server apparatus 104 to the client apparatus 102 and the client apparatus 103 (M1310 and M1313). Then, the relay apparatus 101 transmits the notification of the delivery confirmation of the data to the server apparatus 104 after receiving the confirmation responses indicating that the reception of the transferred data has been completed from both the client apparatus 102 and the client apparatus 103 (M1508).

In this manner, according to the communication system 100 of the present exemplary embodiment, after the relay apparatus 101 receives the confirmation responses from the plurality of client apparatuses set as the transfer destinations of the data, the notification of the delivery confirmation of this data is transmitted to the server apparatus 104. This notification allows the server apparatus 104 to determine whether the data has been delivered to all of the transfer destinations.

Further, the relay apparatus 101 may transmit the provisional response to the server apparatus 104 after receiving the confirmation response from a part of the client apparatuses among the plurality of client apparatuses set as the transfer destinations like M1507. Transmitting the provisional response, which is a different notification from the notification of the delivery confirmation, in this manner allows the server apparatus 104 to determine that the data has been delivered to a part of the transfer destinations. In other words, the server apparatus 104 can determine that the delivery of the data to all of the transfer destinations is not complete at the time point that the provisional response is transmitted. The relay apparatus 101 may transmit only the notification of the delivery confirmation without transmitting the provisional response. By being configured in this manner, the communication system 100 can reduce a communication amount between the relay apparatus 101 and the server apparatus 104 compared to the case where the relay apparatus 101 transmits the provisional response each time the relay apparatus 101 receives the confirmation response from the transfer destination.

Further, the relay apparatus 101 not only transmits the two kinds of notifications (e.g., the provisional response and the notification of the delivery confirmation) but also may transmit three or more kinds of notifications to the server apparatus 104 according to the type of the client apparatus set as the transfer destination of the data, the number of transfer destinations to which the delivery has been completed, and/or the like. Further, the relay apparatus 101 may transmit a similar notification to the server apparatus 104 every time the relay apparatus 101 receives the confirmation response from each of the client apparatuses set as the transfer destinations. In the case of the example illustrated in FIG. 13, the provisional response transmitted in M1507 and the notification of the delivery confirmation transmitted in M1508 may be similar messages to each other. Even this method allows the server apparatus 104 to determine whether the data has been delivered to all of the client apparatuses set as the transfer destinations by determining the number of notifications received from the relay apparatus 101, especially when the server apparatus 104 knows the number of client apparatuses set as the transfer destinations.

As the method by which the server apparatus 104 learns the number of client apparatuses set as the transfer destinations, for example, the relay apparatus 101 may transmit the number of received transfer requests to the server apparatus 104 or may notify the server apparatus 104 each time the transfer request is received from the client apparatus. Then, when the client apparatus unsubscribes to the relay apparatus 101 (cancels the transfer request), the relay apparatus 101 may also notify the server apparatus 104 thereof. Further, for example, if acquiring the push URI from the client apparatus 102, the server apparatus 104 may also acquire the number of other client apparatuses with which the client apparatus 102 shares the identifiers (the client apparatus 103 in the example illustrated in FIG. 3) together therewith.

Figure 13:
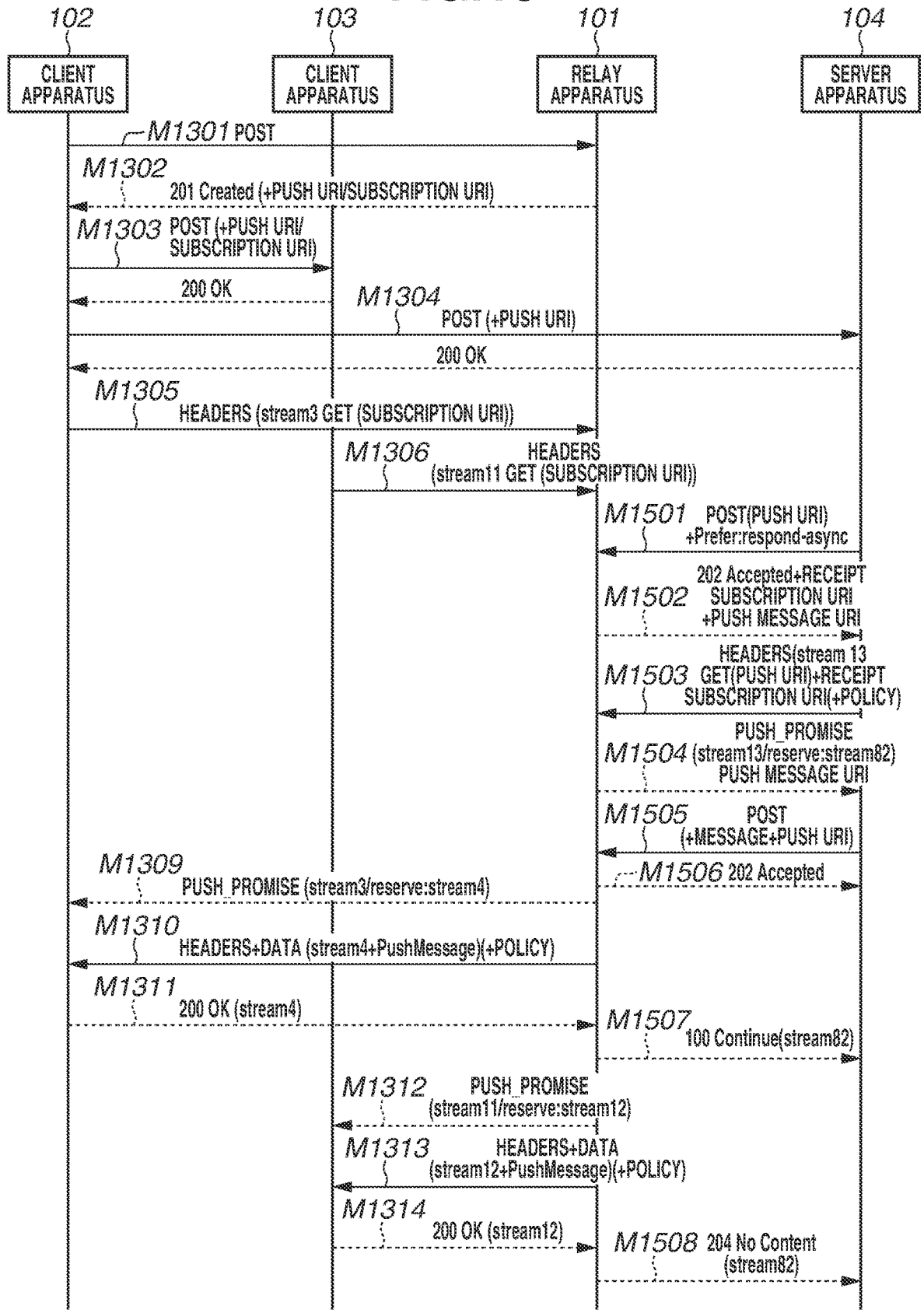
FIG. 13 illustrates an example of an operation sequence of the communication system.

Further, the sequence illustrated in FIG. 13 indicates the example in which all of the transmission sources of the transfer requests received by the relay apparatus 101 (the client apparatus 102 and the client apparatus 103) are set as the transfer destinations of the data. However, the communication system 100 is not limited thereto, and the relay apparatus 101 may transfer the data only to a part of the transmission sources of the transfer requests. Then, the server apparatus 104 may specify whether the relay apparatus 101 transfers the data to all or a part of the transmission sources of the transfer requests according to the push policy.

For example, in the push policy list illustrated in FIG. 11C, "all" is specified as the push policy corresponding to the server apparatus 104. In this case, the relay apparatus 101 searches for the client apparatus that has issued the transfer request from the push distribution list illustrated in FIG. 11B, and the relay apparatus 101 transmits the push messages to all of the client apparatuses meeting the condition.

On the other hand, supposing that the relay apparatus 101 receives a receipt request in which "any" is specified as the push policy from a server apparatus 105 different from the server apparatus 104, the processing in this case proceeds in the following manner. In this case, the relay apparatus 101 transmits the push message to only any one of the client apparatuses that have issued the transfer requests with respect to data transmitted from the server apparatus 105. Then, the relay apparatus 101 transmits the notification of the delivery confirmation to the server apparatus 105 after receiving the confirmation response from the client apparatus set as the transmission destination of the push message. According to this method, the communication system 100 can reduce the communication amount spent for the push message and the processing load imposed on the relay apparatus 101 in a case where it is necessary for notification to be delivered to only any one of the apparatuses that have issued the transfer requests. For example, in a case where the transfer requests are issued from a plurality of apparatuses, such as a smart-phone, a smart-watch, and a tablet, that the same user owns, a success in the delivery of the push notification to one of them allows the user to confirm this notification. In this case, a priority may be set to each of the plurality of apparatuses, and the relay apparatus 101 may transfer the data to an apparatus to which a high priority is set.

Further, the content of the push policy is not limited to these examples, and may be, for example, a content specifying the number of client apparatuses set as the transfer destinations of the data among the client apparatuses that have issued the transfer requests. Alternatively, for example, the push policy may have a content specifying transferring the data to the plurality of client apparatuses that have issued the transfer requests and transmitting the notification of the delivery confirmation after the relay apparatus 101 receives the confirmation response from a part of the client apparatuses among the client apparatuses set as the transfer destinations. Then, the relay apparatus 101 may determine, based on the push policy, whether to transmit the notification of the delivery confirmation after receiving the confirmation responses from all of the plurality of client apparatuses set as the transfer destinations or to transmit the notification of the delivery confirmation after receiving the confirmation response from a part of the client apparatuses. In this case, the relay apparatus 101 transmits the notification of the delivery confirmation to the server apparatus 104 at a timing according to the determination made based on the push policy. Further, the server apparatus 104 may specify whether the relay apparatus 101 transmits the provisional response before the notification of the delivery confirmation. For example, the server apparatus 104 may request the provisional response by adding Expect: 100-Continue in the header of the receipt request in M1503.

Further, information other than the push policy may be used for the determination about which client apparatus the relay apparatus 101 transfers the data to. For example, in a case where "any" is specified as the push policy, the relay apparatus 101 transmits the data to any of the client apparatuses as described above if the relay apparatus 101 knows that the plurality of client apparatuses that have issued the transfer requests are ready to receive the data. On the other hand, if the relay apparatus 101 does not know whether the plurality of client apparatuses that have issued the transfer requests are ready to receive the data, the relay apparatus

101 may transfer the data to the plurality of client apparatuses, and the relay apparatus 101 may transmit the notification of the delivery confirmation according to reception of the confirmation request from any of the client apparatuses. This method can realize more appropriate data transfer processing according to a status of the client apparatus.

Figure 14:
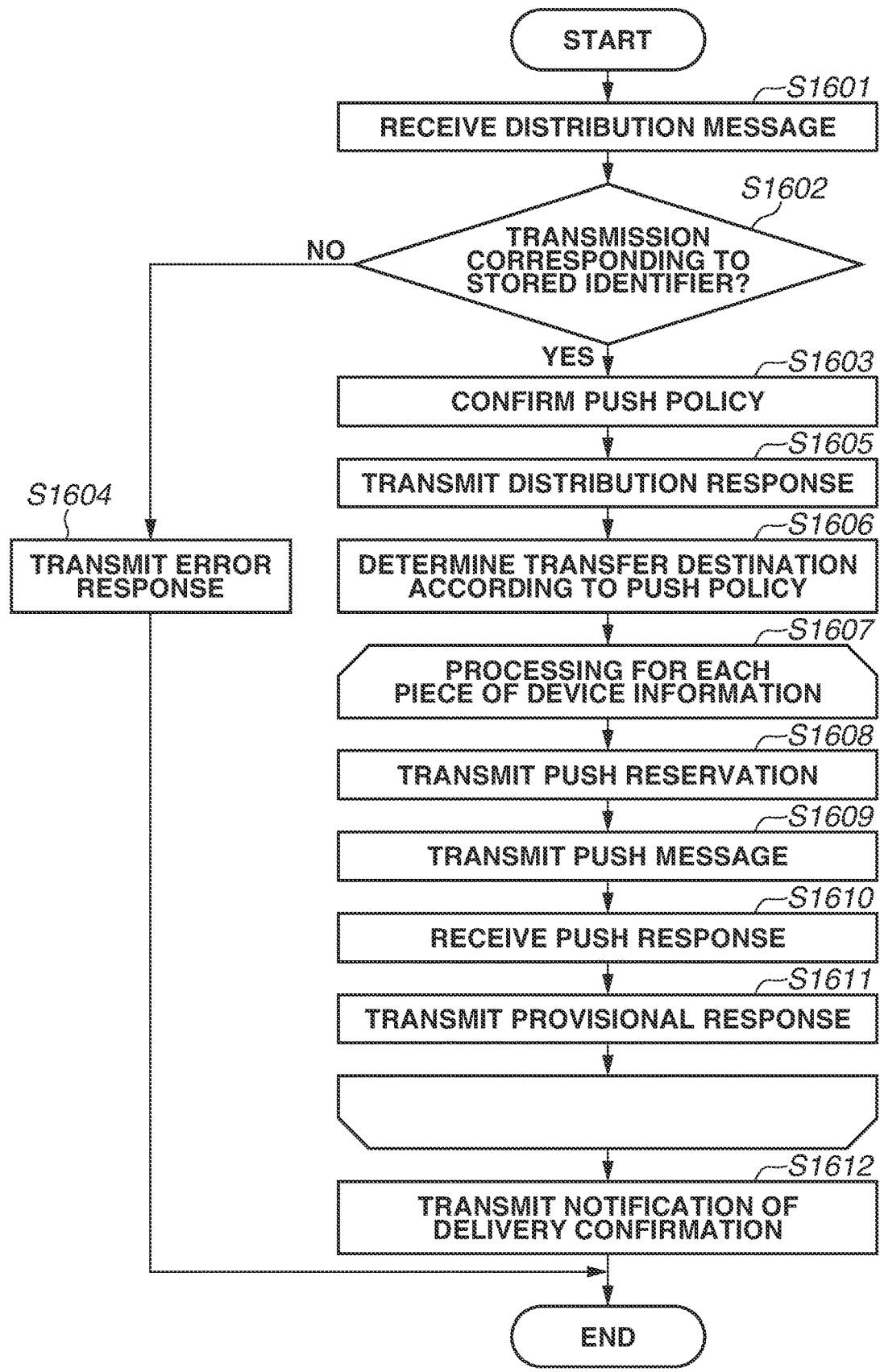
FIG. 14 is a flowchart illustrating an operation regarding transmission of the push message and a receipt by the relay apparatus.

FIG. 14 is a flowchart illustrating processing in which the relay apparatus 101 transmits the push messages to the client apparatus 102 and the client apparatus 103 according to the present exemplary embodiment. The processing illustrated in FIG. 14 is started at the timing when the relay apparatus 101 receives the distribution message from the server apparatus 104. In S1601, the relay apparatus 101 receives the distribution message containing the identifier from the server apparatus 104. In S1602, the relay apparatus 101 compares the identifier received in S1601 and the identifier stored in the identifier list in S504. Then, if the received identifier is contained in the identifier list (YES in S1602), the processing proceeds to S1603. If the received identifier is not contained in the identifier list (NO in S1602), the processing proceeds to S1604.

In S1603, the relay apparatus 101 confirms the push policy corresponding to the push URI of the distribution message received in S1601 from the push policy list illustrated in FIG. 11C. Then, in S1605, the relay apparatus 101 transmits the distribution response to the server apparatus 104. On the other hand, in S1604, the relay apparatus 101 transmits the error response to the server apparatus 104 and ends the processing illustrated in FIG. 14.

In S1606, the relay apparatus 101 determines the transfer destination of the push message according to the push policy confirmed in S1603. For example, if "all" is specified as the push policy, and if the relay apparatus 101 has received the transfer requests corresponding to the distribution message received in S1601 from the plurality of client apparatuses, this plurality of client apparatuses are all determined to be set as the transfer destinations. On the other hand, in a case where "any" is specified as the push policy, the relay apparatus 101 determines to set, as the transfer destination, any one client apparatus among the plurality of client apparatuses operating as the transmission sources of the received transfer requests. Further, if the number of transfer destinations is specified by the push policy, as many client apparatuses as the specified number are determined to be set as the transfer destinations.

In S1607, the relay apparatus 101 performs processes of S1608 to S1611 with respect to each of the transfer destinations determined in S1606 among the pieces of device information corresponding to the identifier received in S1601 in the push distribution list stored in S603. In S1608, the relay apparatus 101 transmits the push reservation to the client apparatus corresponding to the targeted device information. In S1609, the relay apparatus 101 transmits the push message to the client apparatus corresponding to the targeted device information. In S1610, the relay apparatus 101 receives the push response from the client apparatus set as the transfer destination of the push message in S1609. In S1611, the relay apparatus 101 transmits the provisional response (HTTP 100 Continue) to the server apparatus 104. This provisional response may contain information indicating which client apparatus the push response was received from with the use of, for example, a fully qualified domain name (FQDN), an Internet Protocol (IP) address, or another identifier.

In a case where the plurality of pieces of device information corresponding to the push URI received in S1601 are determined to be the transfer destinations, in S1608 to S1611, the relay apparatus 101 transfers the distribution message received in S1601 to the plurality of client apparatuses according to the determination of the transfer destinations. Now, a case where the plurality of pieces of device information corresponding to the same push URI are determined to be the transfer destinations means that the relay apparatus 101 has received the transfer requests based on the same subscription URI from the plurality of client apparatuses determined to be the transfer destinations.

When the processes of S1608 to S1611 are ended with respect to all of the transfer destinations, in S1612, the relay apparatus 101 transmits, to the server apparatus 104, the notification of the delivery confirmation indicating that the push messages have been delivered to all of the transfer destinations, and the relay apparatus 101 ends the processing. On the other hand, in S1612, the relay apparatus 101 transmits the error response instead of the notification of the delivery confirmation, for example, in a case of failing to deliver the push message meeting the specified push policy or in a case where the delivery is timed out before the delivery is completed. The error response may contain the identification information of the client apparatus to which the data has been delivered, the identification information of the client apparatus to which the data has failed to be delivered, information indicating a cause of the failure to deliver the data, and/or the like. The transmission of the provisional response in S1611 may be carried out with respect to only a part of the transfer destinations. For example, in a case of receiving the last push response among the push responses transmitted from the plurality of transfer destinations, the relay apparatus 101 may transmit the notification of the delivery confirmation in S1612 without transmitting the provisional response in S1611. Alternatively, for example, when the server apparatus 104 knows the number of client apparatuses set as the transfer destinations, the relay apparatus 101 may transmit only the provisional response in S1611 without transmitting the notification of the delivery confirmation in S1612.

Further, if the push policy specifies notifying the server apparatus 104 of the delivery confirmation in a case where the push message has been delivered to a part of the transfer destinations (n transfer destinations) among the plurality of transfer destinations, the relay apparatus 101 performs the processes of S1608 to S1611 with respect to all of the transfer destinations in parallel. Then, the relay apparatus 101 confirms the number of push responses received in S1610. When this number reaches n, the processing exits the loop, and, in S1612, the notification of the delivery confirmation is transmitted. If the push policy specifies the client apparatus as the transfer destination, the transmission of the push message according to the push policy can also be realized by performing similar processing.

Figure 15:
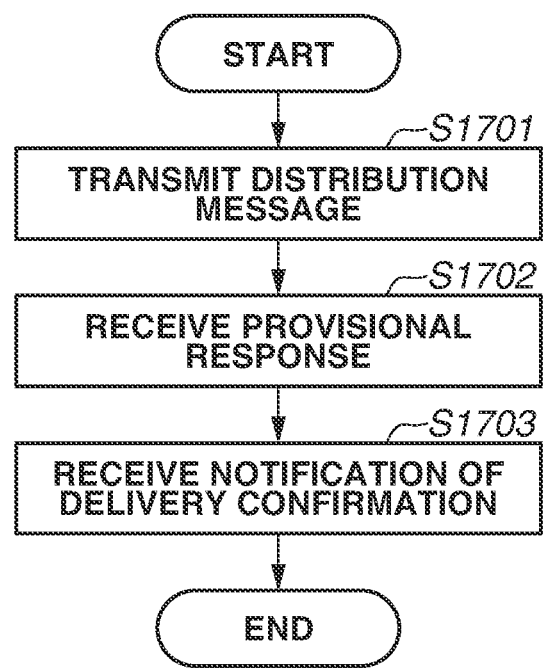
FIG. 15 is a flowchart illustrating an operation regarding the transmission of the message by the server apparatus.

FIG. 15 is a flowchart illustrating processing in which the server apparatus 104 according to the present exemplary embodiment transmits the distribution message to the relay apparatus 101. The processing illustrated in FIG. 15 is started at, for example, the timing when the server apparatus 104 is instructed to transmit the data by the operation of the user or the like, or the timing when the server apparatus 104 detects the predetermined event with use of the sensor, or the like. However, the start timing of the processing illustrated in FIG. 15 is not limited to the above-described timings.

In S1701, the server apparatus 104 transmits the distribution message to the relay apparatus 101. In S1702, the server apparatus 104 receives the provisional response from the relay apparatus 101. The provisional response indicates that the distribution message has been delivered to a part of the client apparatuses set as the transfer destinations. By this response, the server apparatus 104 can learn a reception status of the message in each of the client apparatuses. In S1703, the server apparatus 104 receives the notification of the delivery confirmation from the relay apparatus 101.

Figure 16:
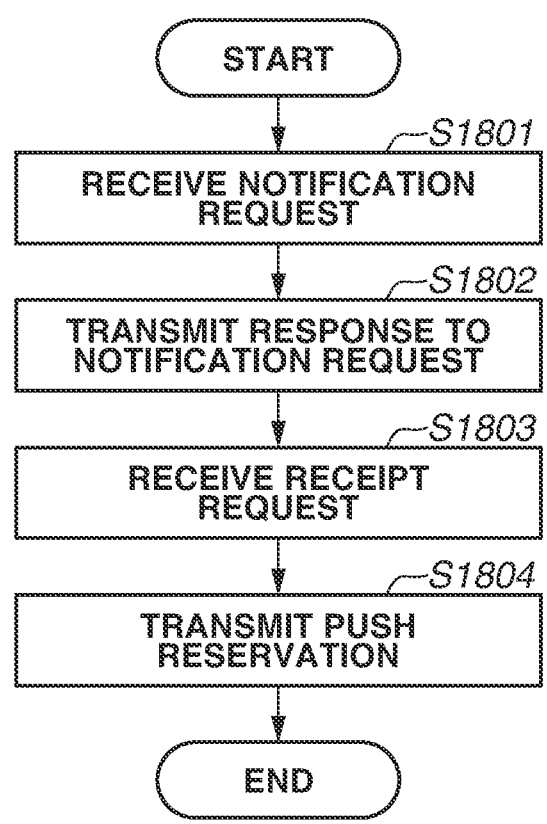
FIG. 16 is a flowchart illustrating an operation regarding preprocessing for the transmission of the receipt by the relay apparatus.

FIG. 16 is a flowchart illustrating preprocessing performed by the relay apparatus 101 according to the present exemplary embodiment to transmit the receipt to the server apparatus 104. The processing illustrated in FIG. 16 is started at, for example, a timing when the server apparatus 104 acquires the push URI from the client apparatus 102. However, the start timing of the processing illustrated in FIG. 16 is not limited to the above-described timing.

In S1801, the relay apparatus 101 receives the notification request for requesting the notification of the delivery confirmation from the server apparatus 104. In S1802, the relay apparatus 101 transmits the response to the notification request to the server apparatus 104. In S1803, the relay apparatus 101 receives the receipt request for requesting the notification of the delivery confirmation, the provisional response, and/or the like from the server apparatus 104. In S1804, the relay apparatus 101 transmits the push reservation for transmitting the receipt by the push-type data transmission to the server apparatus 104.

In the present exemplary embodiment, the communication system 100 has been described focusing on the example in which the server apparatus 104 adds the push policy to the receipt request to be transmitted to the relay apparatus 101. By this addition, the relay apparatus 101 can perform the data transfer processing according to the request from the server apparatus 104. The push policy may be contained in the distribution message to be transmitted from the server apparatus 104 to the relay apparatus 101, or may be transmitted separately from the receipt request and the distribution message. Alternatively, the relay apparatus 101, the client apparatus 102, or the like may determine the push policy, and the server apparatus 104 may be notified of the determined push policy. Further, the push policy may be determined from a negotiation among the plurality of apparatuses. Further, the client apparatus 102 or the client apparatus 103 may determine a policy for receiving the push message and may determine whether to receive the push message transmitted from the relay apparatus 101 according to this reception policy.

According to the above-described exemplary embodiments, the communication apparatus becomes able to appropriately notify the server apparatus that the data has been delivered to the client apparatuses set as the transmission destinations in a case where the data is transmitted from the server apparatus to the plurality of client apparatuses via the communication apparatus.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-211154, which was filed on Oct. 31, 2017, and Japanese Patent Application No. 2017-211157, which was filed on Oct. 31, 2017, both of which are hereby incorporated by reference herein in their entirety.

What is claimed is:

1. A communication apparatus comprising:
one or more hardware processors; and
one or more memories which store instructions executable by the one or more hardware processors to cause the communication apparatus to:
issue first issued information, which is used by receiver devices to receive data to be transmitted from a server apparatus via the communication apparatus, and second issued information, which is used by the server apparatus to transmit data to the receiver devices having the first issued information via the communication apparatus;
receive a transfer request including the first issued information from the receiver devices;
receive, from the server apparatus, data to be transferred that includes the second issued information;
in a case where the transfer request including the first issued information issued by the communication apparatus is received from each of the receiver devices, transfer the data received from the server apparatus to the receiver devices,
wherein, in a case where the received data is not transferred to all of the receiver devices, the received data is transferred only to a part of the receiver devices;
receive, from the receiver devices to which the received data was transferred, confirmation responses indicating that the transferred data has been received by the receiver devices to which the received data was transferred; and
in a case where the received data has been transferred to the receiver devices to which the received data was transferred, transmit a notification of a delivery confirmation of the data to the server apparatus after the confirmation responses are received from the receiver devices to which the received data was transferred.

2. The communication apparatus according to claim 1, wherein the received data is transferred at a timing according to the reception of the data from the server apparatus.

3. The communication apparatus according to claim 1, wherein the instructions further cause the communication apparatus to transmit the first issued information to the receiver devices.

4. The communication apparatus according to claim 1, wherein the instructions further cause the communication apparatus to transmit the second issued information to the server apparatus.

5. The communication apparatus according to claim 1, wherein Uniform Resource Identifiers are issued as the first and second issued information.

6. The communication apparatus according to claim 1, wherein the instructions further cause the communication apparatus to determine whether to transfer the received data to all of the receiver devices,
 wherein, in a case where it is not determined to transfer the received data to all of the receiver devices, the received data is transferred only to the part of the receiver devices.

7. The communication apparatus according to claim 6, wherein whether to transfer the received data to all of the receiver devices is determined based on information added to the received data.

8. The communication apparatus according to claim 1, wherein the first issued information and the second issued information are a subscription URI and a push URI defined in the Web Push protocol, respectively.

9. The communication apparatus according to claim 1, wherein the instructions further cause the communication processing apparatus to
 in a case where the transfer request including the first issued information is received from each of the receiver devices, determine one or more devices that are to be set as a transmission destination of the received data among the receiver devices,
 wherein the received data is transferred to the determined devices.

10. The communication apparatus according to claim 9, wherein the instructions further cause the communication apparatus to
 receive, from the server apparatus, specifying information regarding the number of devices that are to be set as the transmission destinations of the received data,
 wherein the one or more devices that are to be set as the transmission destination of the received data is determined based on the received specifying information.

11. The communication apparatus according to claim 1, wherein the notification of the delivery confirmation is a push message receipt defined in the Web Push protocol.

12. The communication apparatus according to claim 1, wherein the instructions further cause the communication apparatus to transmit a notification indicating that the delivery of the data to the plurality of devices has been uncompleted to the server apparatus in a case where the data is transferred to the receiver devices to which the received data was transferred and the confirmation responses are not received from one or more of the receiver devices to which the received data was transferred.

13. The communication apparatus according to claim 1, wherein the instructions further cause the communication apparatus to
 in a case where the data is transferred to the receiver devices to which the received data was transferred, determine whether to transmit the notification of the delivery confirmation after the confirmation responses are received from each of the receiver devices to which the received data was transferred or to transmit the notification of the delivery confirmation after the confirmation responses are received from a part of the receiver devices to which the received data was transferred,
 wherein the notification of the delivery confirmation is transmitted to the server apparatus at a timing according to the determination.

14. The communication apparatus according to claim 13, wherein whether to transmit the notification of the delivery confirmation after the confirmation responses are received from each of the receiver devices to which the received data was transferred or to transmit the notification of the delivery confirmation after the confirmation responses are received from a part of the receiver devices to which the received data was transferred, is determined based on information received from the server apparatus.

15. A communication method for a communication apparatus to transfer data, the communication method comprising:
 issuing first issued information, which is used by receiver devices to receive data to be transmitted from a server apparatus via the communication apparatus, and second issued information, which is used by the server apparatus to transmit data to the receiver devices having the first issued information via the communication apparatus;
 receiving a transfer request including the first issued information from the receiver devices;
 receiving, from the server apparatus, data to be transferred that includes the second issued information;
 in a case where the transfer request including the first issued information issued by the communication apparatus is received from each of the receiver devices, transferring the data received from the server apparatus to the receiver devices,
 wherein, in a case where the received data is not transferred to all of the receiver devices, the received data is transferred only to a part of the receiver devices;
 receiving, from the receiver devices to which the received data was transferred, confirmation responses indicating that the transferred data has been received by the receiver devices to which the received data was transferred; and
 in a case where the received data has been transferred to the receiver devices to which the received data was transferred, transmitting a notification of a delivery confirmation of the data from the communication apparatus to the server apparatus after the communication apparatus receives the confirmation responses from the receiver devices to which the received data was transferred.

16. A non-transitory computer-readable storage medium storing a program for causing a computer to perform a communication method for a communication apparatus to transfer data, the communication method comprising:
 issuing first issued information, which is used by receiver devices to receive data to be transmitted from a server apparatus via the communication apparatus, and second issued information, which is used by the server apparatus to transmit data to the receiver devices having the first issued information via the communication apparatus;

receiving a transfer request including the first issued information from the receiver devices;

receiving, from the server apparatus, data to be transferred that includes the second issued information;

in a case where the transfer request including the first issued information issued by the communication apparatus is received from each of the receiver devices, transferring the data received from the server apparatus to the receiver devices, wherein, in a case where the received data is not transferred to all of the receiver devices, the received data is transferred only to a part of the receiver devices;

receiving, from the receiver devices to which the received data was transferred, confirmation responses indicating that the transferred data has been received by the receiver devices to which the received data was transferred; and in a case where the received data has been transferred to the receiver devices to which the received data was transferred, transmitting a notification of a delivery confirmation of the data from the communication apparatus to the server apparatus after the communication apparatus receives the confirmation responses from the receiver devices to which the received data was transferred.

* * * * *